US012675557B2

(12) United States Patent
Mohanraj et al.

(10) Patent No.: US 12,675,557 B2
(45) Date of Patent: Jul. 7, 2026

(54) MACHINE LEARNING-BASED SYSTEMS AND METHODS FOR AUTOMATICALLY REMOVING PROTECTED CONTENT FROM A RAW MEDIA ITEM

(71) Applicant: Whitebalance Video Corp, Washington, DC (US)

(72) Inventors: Hariharan Mohanraj, Washington, DC (US); Lorraine Ma, Washington, DC (US); Christopher Landschoot, Chicago, IL (US)

(73) Assignee: Whitebalance Video Corp, Washington, DC (US)

( * ) Notice: Subject to any disclaimer, the term of this patent is extended or adjusted under 35 U.S.C. 154(b) by 0 days.

(21) Appl. No.: 19/384,400

(22) Filed: Nov. 10, 2025

(65) Prior Publication Data

US 2026/0134066 A1      May 14, 2026

Related U.S. Application Data

(60) Provisional application No. 63/718,111, filed on Nov. 8, 2024.

(51) Int. Cl.
| | |
|---|---|
| *G06F 21/10* | (2013.01) |
| *G06F 3/16* | (2006.01) |
| *G10L 19/008* | (2013.01) |
| *G10L 21/0272* | (2013.01) |

(52) U.S. Cl.
CPC ............ *G06F 21/106* (2023.08); *G06F 3/165* (2013.01); *G10L 19/008* (2013.01); *G10L 21/0272* (2013.01)

(58) Field of Classification Search
CPC ..... G06F 21/106; G06F 3/165; G10L 19/008; G10L 21/0272
See application file for complete search history.

(56) References Cited

U.S. PATENT DOCUMENTS

| | | | | |
|---|---|---|---|---|
| 11,783,115 | B1 * | 10/2023 | Miller | ................... G06F 40/134 |
| | | | | 715/255 |
| 12,022,157 | B2 * | 6/2024 | Petty | .................... G11B 27/036 |
| 2020/0110858 | A1 * | 4/2020 | Lyu | ......................... G06N 20/20 |
| 2021/0067842 | A1 * | 3/2021 | Revital | ............... G06F 21/1063 |
| 2021/0397680 | A1 * | 12/2021 | Borkar | .................. G06F 16/285 |

(Continued)

*Primary Examiner* — Techane Gergiso
(74) *Attorney, Agent, or Firm* — Padowithz Alce; Quintin Scheitlin; Alce PLLC

(57)      ABSTRACT

A computer-implemented method includes receiving a subscriber-initiated request to remove protected content from a raw media item, detecting a plurality of acoustic features associated with the raw media item, based on the plurality of acoustic features indicating that the raw media item includes the one or more protected media assets, automatically routing the raw media item to an audio sanitization service, separating, in response to the audio sanitization service executing a plurality of audio separation machine learning models, the one or more protected media assets from non-protected portions of the raw media item to generate a plurality of sanitized instances of the raw media item; and returning, as a response to the subscriber-initiated request, the plurality of sanitized instances of the raw media item to prevent unauthorized electronic distribution of the one or more protected media assets within the raw media item.

18 Claims, 9 Drawing Sheets

(56) References Cited

U.S. PATENT DOCUMENTS

| | | | | |
|---|---|---|---|---|
| 2022/0138287 A1* | 5/2022 | Tuinhof | ................ | G06F 21/125 |
| | | | | 705/51 |
| 2022/0397686 A1* | 12/2022 | Scacchi | ................ | G01S 19/485 |
| 2023/0004664 A1* | 1/2023 | Hayes | ..................... | H04L 63/08 |
| 2024/0020788 A1* | 1/2024 | Luo | ........................ | G06T 1/0085 |
| 2024/0040164 A1* | 2/2024 | Jethwa | .................. | G06N 20/00 |
| 2025/0131928 A1* | 4/2025 | Drolet | ................... | G10L 19/018 |
| 2025/0337574 A1* | 10/2025 | Wood | ........................ | H04L 9/32 |

* cited by examiner

100

Client Device 105

Client Device 105

Client Device 105

Network(s) 110

Remote Media Sanitization Service 115

Audio Recognition Microservice 120

Audio Separation Microservice 125

Machine Learning Model(s) 130

Data Store(s) 135

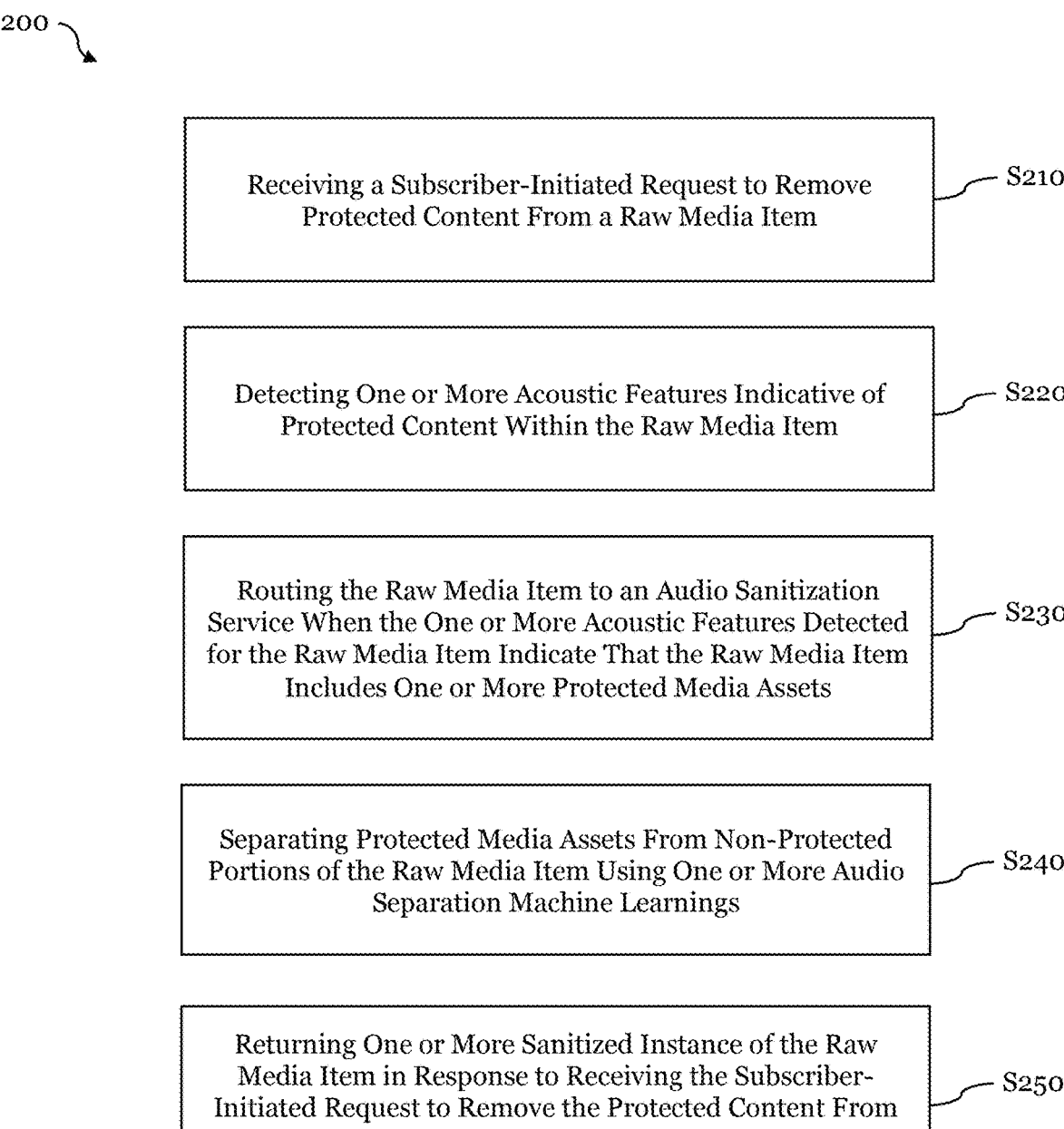

200

Receiving a Subscriber-Initiated Request to Remove Protected Content From a Raw Media Item — S210

Detecting One or More Acoustic Features Indicative of Protected Content Within the Raw Media Item — S220

Routing the Raw Media Item to an Audio Sanitization Service When the One or More Acoustic Features Detected for the Raw Media Item Indicate That the Raw Media Item Includes One or More Protected Media Assets — S230

Separating Protected Media Assets From Non-Protected Portions of the Raw Media Item Using One or More Audio Separation Machine Learnings — S240

Returning One or More Sanitized Instance of the Raw Media Item in Response to Receiving the Subscriber-Initiated Request to Remove the Protected Content From the Raw Media Item — S250

FIG. 2

Raw Media
Item

Separated
Output(s)

MACHINE LEARNING-BASED SYSTEMS AND METHODS FOR AUTOMATICALLY REMOVING PROTECTED CONTENT FROM A RAW MEDIA ITEM

CROSS-REFERENCE TO RELATED APPLICATIONS

This application claims the benefit of U.S. Provisional Application No. 63/718,111, filed 8 Nov. 2024, which is incorporated herein in its entirety by this reference.

TECHNICAL FIELD

This invention relates generally to the digital media field, and more specifically, to new and useful systems and methods for removing protected content from digital media.

BACKGROUND

Raw media captured during live events, broadcasts, and user-generated recordings often contains protected and non-protected audio content. Protected audio content may include copyrighted or licensed musical works that a subscriber does not own or have authorization to redistribute. Non-protected audio content may include speech, crowd noise, or ambient sounds that are free of copyrighted material.

Until the protected content is removed, a subscriber may be unable to publish, stream, or otherwise distribute the raw media without violating copyright restrictions or triggering automated takedown mechanisms on digital platforms. Therefore, there is a need for computer-implemented systems and methods that can automatically detect, isolate, and remove protected audio content from mixed recordings in a manner that allows the resulting media to be redistributed without infringing copyright.

The embodiments of the present application provide technical solutions that address, at least, the needs described above, as well as the deficiencies of the state of the art.

BRIEF SUMMARY OF THE INVENTION(S)

In some embodiments, a computer-implemented method for automatically removing protected content from a raw media item includes: at a remote media sanitization service being implemented by a distributed network of computers: receiving, via the distributed network of computers, a subscriber-initiated request to remove protected content from a raw media item; detecting, via the distributed network of computers, a plurality of acoustic features associated with the raw media item based on routing the raw media item to an audio recognition service, wherein detecting the plurality of acoustic features associated with the raw media item includes: detecting, by the audio recognition service executing a protected-content recognition model (e.g., a trained protected content recognition model), a presence of one or more protected media assets within the raw media item, detecting, by the audio recognition service executing a protected-content localization machine learning model (e.g., a trained protected content recognition model), one or more time-indexed segments of the raw media item indicating where the one or more protected media assets temporally occur within the raw media item, and detecting, by the audio recognition service executing an audio origination machine learning model (e.g., a trained protected content recognition model), an audio origination source of the one or more protected media assets in each of the one or more time-indexed segments; based on the plurality of acoustic features indicating that the raw media item includes the one or more protected media assets, automatically routing, by the distributed network of computers, the raw media item from the audio recognition service to an audio sanitization service implementing a plurality of audio separation machine learning models; separating, in response to the audio sanitization service executing the plurality of audio separation machine learning models, the one or more protected media assets from non-protected portions of the raw media item to generate a plurality of sanitized instances of the raw media item; and returning, as a response to the subscriber-initiated request, the plurality of sanitized instances of the raw media item to prevent unauthorized electronic distribution of the one or more protected media assets within the raw media item.

In some embodiments, at least the audio origination machine learning model and the plurality of audio separation models are trained using a plurality of synthetic audio composites that simulate real-world combinations of protected content and non-protected content, and generating the plurality of synthetic audio composites includes: (A) obtaining a corpus of protected audio content from a protected-content repository and a corpus of event noises from an event sound repository, (B) randomly sampling one or more protected audio segments from the corpus of protected audio content and one or more event noise segments from the corpus of event noises, (C) executing one or more audio augmentation operations on the one or more protected audio segments and the one or more event noise segments to generate one or more augmented protected audio segments and one or more augmented event noise segments, (D) randomly sampling an impulse-response environment file from an impulse-response environment library comprising a plurality of impulse-response files that each represent acoustic characteristics of a distinct physical environment, (E) inserting the one or more augmented protected audio segments at one or more first locations in the impulse-response file and the one or more augmented event noise segments at one or more second locations in the impulse-response file, (F) generating a respective synthetic audio composite that includes: the impulse-response file with the one or more augmented protected audio segments at the one or more first locations in the impulse-response file and the one or more augmented event noise segments at the one or more second locations, and protected-content classification metadata indicating that the impulse-response file includes the protected content at the one or more first locations and the non-protected content at the one or more second locations of the impulse-response file; and (G) automatically repeating (B)-(F) until the plurality of synthetic audio composites satisfy a training sample diversity threshold.

In some embodiments, using the plurality of synthetic audio composites to train the audio origination machine learning model includes creating a plurality of audio origination data training samples from the plurality of synthetic audio composites, wherein each of the plurality of audio origination data training samples: corresponds to a respective synthetic audio composite of the plurality of synthetic audio composites, includes an input feature comprising the impulse-response file, includes a first audio origination source label when the impulse-response file is simulating a production-source environment, and includes a second audio origination source label when the impulse-response file is simulating a live-source environment; inputting the plurality of audio origination data training samples to the audio origination machine learning model; and training the audio origination machine learning model to classify the input feature in each of the plurality of audio origination data training samples to one of: the first audio origination source label, and the second audio origination source label.

In some embodiments, using the plurality of synthetic audio composites to train the plurality of audio separation machine learning models includes creating a plurality of audio separation training data samples from the plurality of synthetic audio composites, wherein each of the plurality of audio separation training data samples: corresponds to a respective synthetic audio composite of the plurality of synthetic audio composites, includes an input feature comprising the impulse-response file, the impulse-response file including the one or more augmented protected audio segments and the one or more augmented event noise segments, and includes a target output feature comprising a first separated waveform comprising the one or more augmented protected audio segments and a second separated waveform comprising the one or more augmented event noise segments; inputting the plurality of audio separation training data samples to the plurality of audio separation machine learning models, and training the plurality of audio separation machine learning models to separate the input feature in each of the plurality of audio separation training data samples into the first separated waveform and the second separated waveform.

In some embodiments, the raw media item corresponds an audio-video recording comprising synchronized audio data and video data, the audio data in the audio-video recording includes: non-protected audio data at least comprising speech audio, crowd noise, and sports-related sounds, and protected audio data comprising the one or more protected media assets, wherein the one or more protected media asset correspond to one or more unlicensed songs.

In some embodiments, separating the one or more protected media assets from the non-protected portions of the raw media item to generate the plurality of sanitized instances of the raw media item includes: inputting the raw media item to at least a first audio separation machine learning model and a second audio separation machine learning model of the plurality of audio separation machine learning models, wherein each of the plurality of audio separation machine learnings comprise a distinct set of separation and reconstruction weight and bias parameters; generating, via the distinct set of separation and reconstruction weight and bias parameters associated with the first audio separation machine learning model, a first reconstructed audio track of the audio data that reconstructs the non-protected audio data while suppressing spectral components corresponding to the protected audio data; generating, via the distinct set of separation and reconstruction weight and bias parameters associated with the second audio separation machine learning model, a second reconstructed audio track of the audio data that reconstructs the non-protected audio data while suppressing the spectral components corresponding to the protected audio data; merging the first reconstructed audio track with the video data of the raw media item to generate to a first sanitized instance of the plurality of sanitized instances of the raw media item; and merging the second reconstructed audio track with the video data of the raw media item to generate to a second sanitized instance of the plurality of sanitized instances of the raw media item.

In some embodiments, the protected-content recognition model detects the presence of the one or more protected media assets by: generating, via the protected-content recognition model, a fingerprint vector of the raw media item that numerically encodes spectral and temporal characteristics of audio data in the raw media item; constructing, via the protected-content recognition model, a protected-content search query that includes the fingerprint vector of the raw media item as a search parameter; executing, via the protected-content recognition model, the protected-content search query against a protected-content fingerprint repository comprising a plurality of protected-content fingerprint vectors of a corpus of protected-content; and detecting, via the protected-content recognition model, one or more temporal segments of the raw media item that include the one or more protected media assets.

In some embodiments, returning the response to the subscriber-initiated request includes: generating, based on the plurality of acoustic features detected within the raw media item, a protected-content segmentation map comprising a plurality of gradient-encoded segments extending from a start to an end of the raw media item, wherein each gradient-encoded segment of the plurality of gradient-encoded segments: corresponds to a distinct time between the start and the end of the raw media item, and is assigned a gradient intensity value based on a likelihood that the distinct time within the raw media item includes the presence of the one or more protected media assets; and displaying a graphical user interface that includes the plurality of sanitized instances of the raw media item and the protected-content segmentation map of the raw media item.

In some embodiments, the protected-content recognition model detects that the one or more protected media assets occur across one or more time intervals of the raw media item, the audio origination machine learning model further detects the audio origination source of one or more second time-indexed segments, wherein the one or more second time-indexed segments is a superset of the one or more time-indexed segments, and assigning the gradient intensity value to each gradient-encoded segment of the plurality of gradient-encoded segments at least includes: detecting one or more remaining time intervals in the raw media item that do not overlap with the one or more time intervals detected by the protected-content recognition model, the one or more time-indexed segments detected by the protected-content localization machine learning model, and the one or more second time-indexed segments detected by the audio origination machine learning model, and assigning a pre-defined low gradient intensity value to a subset of the plurality of gradient-encoded segments that correspond to the one or more remaining time intervals.

In some embodiments, assigning the gradient intensity value to each gradient-encoded segment of the plurality of gradient-encoded segments includes: detecting that the one or more second time-indexed segments comprise a subset of time-indexed segments that are not included in the one or more time-indexed segments detected by the protected-content localization machine learning model, assigning a pre-defined intermediate gradient intensity value to a subset of the plurality of gradient-encoded segments that correspond to the subset of time-indexed segments, detecting a common set of time-indexed segments across the one or more time-indexed segments detected by the protected-content localization machine learning model and the one or more second time-indexed segments detected by the audio origination machine learning model, and assigning a pre-defined high gradient intensity value to a subset of the plurality of gradient-encoded segments that correspond to the common set of time-indexed segments across the one or more time-indexed segments and the one or more second time-indexed segments.

In some embodiments, detecting the presence of the one or more protected media assets within the raw media item at least includes detecting that a first protected media asset begins at a first time within the raw media item and that a second protected media asset begins at a second time within the raw media item, and generating the protected-content segmentation map includes: detecting that the first time within the raw media item corresponds to a first gradient-encoded segment of the plurality of gradient-encoded segments and that the second time within the raw media item corresponds to a second gradient-encoded segment of the plurality of gradient-encoded segments, and superimposing a first protected-content marker on the first gradient-encoded segment and a second protected-content marker on the second gradient-encoded segment.

In some embodiments, the computer-implemented further comprises: receiving, via the graphical user interface, a first input selecting the first-protected content marker and a second input selecting the second protected-content marker; in response to receiving the first input selecting the first-protected content marker, displaying a first protected-content tooltip in association with the first-protected content marker, wherein the first protected-content tooltip includes text indicating a name associated with the first protected media asset and that the first protected media asset begins at the first time within the raw media item; and in response to receiving the second input selecting the second-protected content marker, displaying a second protected-content tooltip in association with the second-protected content marker, wherein the second-protected content marker includes text indicating a name associated with the second protected media asset and that the second protected media asset begins at the second time within the raw media item.

In some embodiments, the graphical user interface displays the protected-content segmentation map in association with a media playback element and a play-pause control element, separate from native playback controls associated with the media playback element, the computer-implemented method further comprising: receiving, via the graphical user interface, an input selecting a respective gradient-encoded segment of the plurality of gradient-encoded segments; in response to receiving the input: changing a playback position of the media playback element to correspond to the distinct time associated with the respective gradient-encoded segment; automatically playing, by the media playback element, the raw media item from the playback position; and while the media playback element is playing the raw media item, continuously updating a playback progress indicator of the protected-content segmentation map in real time to indicate a current playback position of the raw media item relative to the plurality of gradient-encoded segments; after receiving the input selecting the respective gradient-encoded segment, receiving a second input selecting the play-pause control element while the media playback element is playing the raw media item; and pausing the raw media item in the media playback element in response to receiving the second input selecting the play-pause control while the media playback element is playing the raw media item.

In some embodiments, updating the playback progress indicator in real time as the media playback element is playing the raw media item includes: moving the playback progress indicator along the protected-content segmentation map in synchronization with the current playback position of the raw media item in the media playback element, and as the playback progress indicator of the protected-content segmentation map is moving in synchronization with the current playback position of the raw media item in the media playback element, dynamically changing an opacity of one or more gradient-encoded segments of the plurality of gradient-encoded segments to visually indicate that the current playback position of the raw media item has progressed beyond the distinct time associated with each of the one or more gradient-encoded segments.

In some embodiments, the graphical user interface includes a first container comprising: a content readiness indicator that instructs a subscriber to review the raw media item before publication when the presence of one or more protected media assets is detected in the raw media item, the protected-content segmentation map, the play-pause control that, when selected, causes the media playback element to play the raw media item, and a protected-asset table that comprising one or more rows that each include metadata corresponding to a distinct one of one or more protected media assets detected within the raw media item.

In some embodiments, the graphical user interface includes: a second container comprising the media playback element; and a third container comprising metadata associated with the raw media item, including at least: a filename associated with the raw media item, an amount of time required to generate the plurality of sanitized instances of the raw media item, the subscriber that uploaded the raw media item to the remote media sanitization service, and an upload date associated with the raw media item, a duration of the raw media item.

In some embodiments, the graphical user interface includes a fourth container comprising: a download selectable object that, when selected, causes the plurality of sanitized instances of the raw media item to be downloaded to a target electronic device, and a plurality of sanitized-version cards that each: correspond to a distinct sanitized instance of the plurality of sanitized instances of the raw media item, include a second play-pause control that, when selected, causes the distinct sanitized instance to play in the media playback element, a second download selectable object that, when selected, causes the distinct sanitized instance to be downloaded to the target electronic device, a copy link selectable object that, when selected, causes a shareable network link associated with the distinct sanitized instance to be copied to a clipboard of the target electronic device, and a publication readiness indicator that indicates that the distinct sanitized instance is ready to publish when the distinct sanitized instance does not include the one or more protected media assets.

In some embodiments, a computer-implemented system comprises: a distributed network of computers including at least one server node and one or more client nodes; one or more processors operatively coupled to a memory at the server node; and a non-transitory computer-readable medium storing computer-executable instructions that, when executed by the one or more processors, cause the distributed network of computers to: receive, over a network interface, a subscriber-initiated request to remove protected content from a raw media item uploaded from one of the one or more client nodes; route, via an orchestration service executing on the distributed network of computers, the raw media item to an audio recognition service hosted on the server node; detect, by the audio recognition service, a plurality of acoustic feature vectors associated with the raw media item by executing a set of machine learning models stored in memory, the set of machine learning models comprising: a protected-content recognition model configured to detect a presence of one or more protected media assets within the raw media item, a protected-content localization model configured to identify one or more time-indexed segments of the raw media item indicating where the one or more protected media assets temporally occur, and an audio origination model configured to determine, for each of the one or more time-indexed segments, whether an audio origination source corresponds to a live-source environment or a production-source environment; in response to the plurality of acoustic feature vectors indicating that the raw media item includes the one or more protected media assets, automatically transmit, by the orchestration service, the raw media item from the audio recognition service to an audio sanitization service executing on the distributed network of computers; execute, by the audio sanitization service, a plurality of audio separation machine learning models stored in the memory to separate the one or more protected media assets from non-protected portions of the raw media item and to generate a plurality of sanitized instances of the raw media item; and generate, via a response manager, a response including the plurality of sanitized instances of the raw media item and transmit the response to the client node to prevent unauthorized electronic distribution of the one or more protected media assets.

In some embodiments, a computer-program product comprising a non-transitory machine-readable storage medium storing computer instructions that, when executed by one or more processors, perform operations comprising: receiving, via the distributed network of computers, a subscriber-initiated request to remove protected content from a raw media item; detecting, via the distributed network of computers, a plurality of acoustic features associated with the raw media item based on routing the raw media item to an audio recognition service, wherein detecting the plurality of acoustic features associated with the raw media item includes: detecting, by the audio recognition service executing a protected-content recognition model, a presence of one or more protected media assets within the raw media item, detecting, by the audio recognition service executing a protected-content localization machine learning model, one or more time-indexed segments of the raw media item indicating where the one or more protected media assets temporally occur within the raw media item, and detecting, by the audio recognition service executing an audio origination machine learning model, an audio origination source associated with each of the one or more time-indexed segments that contain the one or more protected media assets; based on the plurality of acoustic features indicating that the raw media item includes the one or more protected media assets, automatically routing, by the distributed network of computers, the raw media item from the audio recognition service to an audio sanitization service implementing a plurality of audio separation machine learning models; separating, in response to the audio sanitization service executing the plurality of audio separation machine learning models, the one or more protected media assets from non-protected portions of the raw media item to generate a plurality of sanitized instances of the raw media item; and returning, as a response to the subscriber-initiated request, the plurality of sanitized instances of the raw media item to prevent unauthorized electronic distribution of the one or more protected media assets within the raw media item.

In some embodiments, returning the response to the subscriber-initiated request includes: generating, based on the plurality of acoustic features detected within the raw media item, a protected-content segmentation map comprising a plurality of gradient-encoded segments extending from a start to an end of the raw media item, wherein each gradient-encoded segment of the plurality of gradient-encoded segments: corresponds to a distinct time between the start and the end of the raw media item, and is assigned a gradient intensity value based on a likelihood that the distinct time within the raw media item includes the presence of the one or more protected media assets; and displaying a graphical user interface that includes the plurality of sanitized instances of the raw media item and the protected-content segmentation map of the raw media item.

In some embodiments, a computer-implemented method for automatically removing protected content from a raw media item comprises at a remote media sanitization service being implemented by a distributed network of computers: receiving, via the distributed network of computers, a subscriber-initiated request to remove protected content from a raw media item; in response to receiving the subscriber-initiated request: automatically routing, by the distributed network of computers, the raw media item to an audio recognition service of the media sanitization service that comprises one or more trained protected content recognition models; generating, by the protected content recognition service executing the one or more trained protected content recognition models, one or more audio origination labels that indicate an origination source for audio associated with one or more temporal segments of the raw media item; automatically routing, by the distributed network of computers, the raw media item to an audio sanitization service of the media sanitization service that comprises a plurality of trained audio separation machine learning models; generating, by the audio sanitization service executing the plurality of trained audio separation machine learning models, a plurality of sanitized instances of the raw media item that separate the protected content from non-protected portions of the raw media item; and returning a response to the subscriber-initiated request that uses the one or more audio origination labels and the plurality of sanitized instances of the raw media item to prevent unauthorized electronic distribution of the protected content.

In some embodiments, the one or more trained protected content recognition models and the plurality of audio separation machine learning models are trained using a plurality of synthetic audio composites that simulate real-world combinations of the protected content and non-protected content, and generating the plurality of synthetic audio composites includes: (A) obtaining a corpus of protected audio content from a protected-content repository and a corpus of event noises from an event sound repository, (B) randomly sampling one or more protected audio segments from the corpus of protected audio content and one or more event noise segments from the corpus of event noises, (C) executing one or more audio augmentation operations on the one or more protected audio segments and the one or more event noise segments to generate one or more augmented protected audio segments and one or more augmented event noise segments, (D) randomly sampling an impulse-response environment file from an impulse-response environment library comprising a plurality of impulse-response files that each represent acoustic characteristics of a distinct physical environment, (E) convolving the one or more protected audio segments and the one or more augmented event noise segments with the impulse-response file to generate one or more convolved protected audio segments and one or more convolved event noise segments; (F) generating a respective synthetic audio composite that includes: the one or more convolved protected audio segments at one or more first locations in the respective synthetic audio composite and the one or more convolved event noise segments at one or more second locations in the respective synthetic audio composite, and wherein protected-content classification metadata is stored in association with respective synthetic audio composite and indicates that the respective synthetic audio composite includes the one or more convolved protected audio segments at the one or more first locations and the one or more convolved event noise segments at the one or more second locations; and (G) automatically repeating (B)-(F) until the plurality of synthetic audio composites satisfies a training sample diversity threshold.

In some embodiments, using the plurality of synthetic audio composites to train an audio origination machine learning model of the one or more trained protected content recognition models includes: creating a plurality of audio origination data training samples from the plurality of synthetic audio composites, wherein each of the plurality of audio origination data training samples: corresponds to a respective synthetic audio composite of the plurality of synthetic audio composites, includes an input feature comprising the respective synthetic audio composite, includes a first audio origination source label when the respective synthetic audio composite is simulating a production-source environment, and includes a second, different from the first, audio origination source label when the respective synthetic audio composite is simulating a live-source environment; inputting the plurality of audio origination data training samples to the audio origination machine learning model; and training the audio origination machine learning model to classify the input feature in each of the plurality of audio origination data training samples to one of: the first audio origination source label, and the second audio origination source label.

In some embodiments, using the plurality of synthetic audio composites to train the plurality of trained audio separation machine learning models includes: creating a plurality of audio separation training data samples from the plurality of synthetic audio composites, wherein each of the plurality of audio separation training data samples: corresponds to a respective synthetic audio composite of the plurality of synthetic audio composites, includes an input feature comprising the respective synthetic audio composite, the respective synthetic audio composite including the one or more convolved protected audio segments and the one or more convolved event noise segments, and includes a target output feature comprising a first separated waveform comprising the one or more convolved protected audio segments and a second separated waveform comprising the one or more convolved event noise segments; inputting the plurality of audio separation training data samples to the plurality of trained audio separation machine learning models, and training the plurality of trained audio separation machine learning models to separate the input feature in each of the plurality of audio separation training data samples into the first separated waveform and the second separated waveform.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
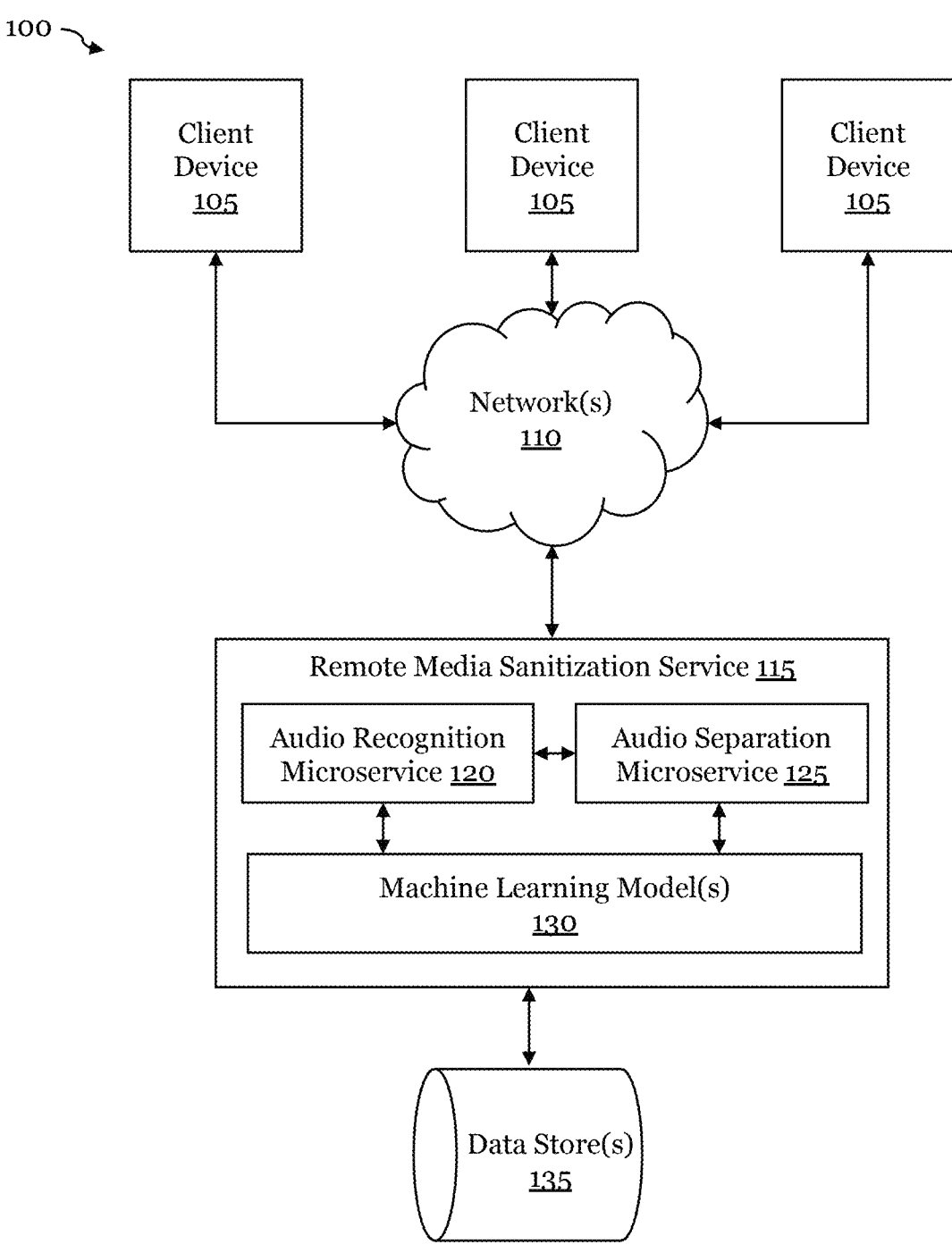
FIG. 1 illustrates a schematic representation of a system 100 in accordance with one or more embodiments of the present application.

1.0 System for Automatically Removing Protected Content from a Raw Media Item As shown in FIG. 1, a system 100 for automatically removing protected content from a raw media item may include one or more client devices 105, one or more communication networks 110, a remote media sanitization service 115, an audio recognition microservice 120, an audio separation microservice 125, a plurality of machine learning models 130, and one or more data stores 135

1.05 Client Devices

In some embodiments, the one or more client devices 105 may attempt to communicate with the remote media sanitization service 115 over one or more communication networks 110. For example, the one or more client devices 105 may send a request to the remote media sanitization service 105 to remove protected content (e.g., copyrighted or licensed music) from one or more raw media items captured or stored by the client devices 105. In response, the one or more client devices 105 may receive one or more sanitized instances of the corresponding raw media item(s) that have been processed by the remote media sanitization service 115 to exclude the protected content.

The client devices 105 may include or correspond to a mobile phone, laptop computer, tablet computer, and/or any other type of electronic device. Client devices 105 may include various sensors, such as one or more one or more image sensors (e.g., cameras), microphone(s), display generation component(s), speaker(s), processor(s), memory(ies), and/or communication circuitry.

In some embodiments, the client devices 105 may locally present a graphical user interface that enables a subscriber to select one or more raw media items for upload, initiate media sanitization requests, and/or review the sanitized instances returned from the media sanitization service 115.

1.10 Communication Network(s)

In some embodiments, the one or more communication networks 110 that enable the client devices 105 to communicate with the remote media sanitization service 115 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces.

As an example, a network in the one or communication networks 110 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the communication networks 110. The one or more communication networks 110 may be incorporated entirely within or can include an intranet, an extranet, or a combination thereof. In some embodiments, communications between two or more systems and/or devices can be achieved by a secure communications protocol, such as secure sockets layer (SSL) or transport layer security (TLS). In addition, data and/or transactional details may be encrypted.

1.15 Remote Media Sanitization Service

In some embodiments, the remote media sanitization service 115 may function to generate one or more sanitized versions of raw media items submitted by subscribers of client devices 105. Each sanitized version of a raw media item may correspond to a reconstructed instance of the raw media item in which protected content (e.g., copyrighted or licensed audio) has been detected and removed, while non-protected portions (e.g., speech, commentary, crowd noise, or ambient sounds) are preserved.

In some embodiments, the remote media sanitization service 115 may be implemented by a distributed network of computers (or just "distributed network"). The distributed network of computers may include one or more control (e.g., server) nodes and one or more worker (e.g., client) nodes. The number and configuration of control and worker nodes may dynamically scale based on system load, the size of active workloads, or available computational capacity across the distributed network.

Each control node may coordinate operations within the distributed network, including task scheduling, node assignment, and inter-node communication. The control nodes may manage queues of media sanitization jobs (e.g., jobs corresponding to the automated processing for detecting, removing, and verifying removal of protected content from a raw media item), partition computational tasks into discrete workloads, and distribute those workloads to available worker nodes. Each worker node may then execute assigned processing operations, such as running one or more trained machine learning models, performing digital signal separation, or verifying content removal results. Upon completion of a task, the worker nodes may return their output to the control node for aggregation, validation, and persistence in distributed storage.

In some embodiments, one or more of the control nodes may be designated as a primary control node that manages job orchestration across the distributed network. The primary control node may oversee active media sanitization jobs, track node performance metrics, and maintain an updated snapshot of system state (e.g., node availability, job progress, and error reports). One or more secondary control nodes may operate in standby as backup controllers. The secondary control nodes may continuously receive state snapshots (e.g., job progress logs, node connection health reports) from the primary control node and maintain synchronization to ensure rapid failover in the event of a failure.

If a primary control node fails, a secondary control node may automatically assume control responsibilities based on a defined control hierarchy, synchronization timestamp, or consensus mechanism (e.g., a distributed leader election protocol). The new control node may resume orchestration using the most recent system snapshot without restarting or losing progress in active media sanitization jobs. Similarly, if a worker node fails during execution, the controlling node may detect the failure, retrieve the worker node's latest recorded checkpoint (e.g., partial model inference results or intermediate audio separation outputs), and reassign its unfinished task to another available worker node for completion.

1.20 Audio Recognition Microservice

In some embodiments, the remote media sanitization service may include an audio recognition microservice 120. The audio recognition microservice 120 may function to detect, localize, and classify protected content within raw media items received by the remote media sanitization service 115. In particular, the audio recognition microservice 120 may analyze audio data contained in a raw media item to determine whether one or more portions of the audio data include copyrighted, licensed, or otherwise protected media assets (e.g., songs, background music, or sound recordings).

In some embodiments, the audio recognition microservice 120 may implement a plurality of machine learning models and digital signal processing models (e.g., a subset of machine learning model(s) 130) that collectively identify protected content at different levels of granularity. For example, the audio recognition microservice 120 may include a protected-content recognition model configured to detect specific songs or recordings within an input audio stream (e.g., by generating and matching an audio fingerprint vector), a protected-content localization model configured to predict time-indexed segments where music occurs (e.g., using frame-level music detection probabilities), and an audio origination classification model configured to predict whether detected music corresponds to live or production audio sources.

1.25 Audio Separation Microservice

In some embodiments, the remote media sanitization service 115 may include an audio separation microservice 125. The audio separation microservice 125 may function to isolate and remove protected audio content from raw media items based on detections, localizations, and classifications produced by the audio recognition microservice 120. In particular, the audio separation microservice 125 may receive a raw media item (or one or more time-indexed portions thereof) and execute one or more trained audio separation machine learning models to separate protected and non-protected components of the raw media item while maintaining synchronization with any associated video data.

In some embodiments, the audio separation microservice 125 may implement a plurality of audio separation machine learning models (e.g., a subset of machine learning model(s) 130). As generally used herein, an audio separation machine learning model may refer to a trained machine learning model (e.g., neural network) configured to receive a raw media item (or one or more portions thereof) as input and generate, as output, one or more separated audio tracks or waveforms that distinguish and isolate protected content from non-protected content within the raw media item.

1.30 Machine Learning Model(s)

In some embodiments, the remote media sanitization service 115 may train and/or execute one or more machine learning models 130. The one or more machine learning models 130 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each model can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a backpropagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

A more specific example of a machine learning model 130 may include a neural network comprising multiple layers of interconnected neurons that exchange data through selectively weighted connections. The layers may include an input layer configured to receive input data (e.g., numerical representations of audio features), one or more hidden layers configured to extract and transform those features through nonlinear operations, and an output layer configured to produce a prediction or classification inference (e.g., whether a given segment of audio includes protected content). The hidden layers are considered "hidden" because their internal feature transformations are not directly observable during inference. A given machine learning model may include any number and combination of layers and neurons depending on the model architecture and the complexity of the classification or separation task.

The neurons and their interconnecting weights within the machine learning model 130 may be trained using large volumes of labeled or synthetic data (e.g., synthetic audio data). Each weight may be iteratively adjusted during training to minimize the difference between predicted and actual outputs. In some embodiments, the training process may employ backpropagation, which computes the gradient of each weight relative to an error function and updates the weight to reduce overall prediction error. This process may be repeated across many training iterations until the machine learning model 130 converges to an optimal configuration capable of accurately distinguishing protected from non-protected audio features.

In some embodiments, the machine learning model 130 may implement a feed-forward neural network in which data flows in one direction—from the input layer through successive hidden layers to the output layer—with no cyclical dependencies. Alternatively, the machine learning model 130 may implement a recurrent neural network configured with feedback connections that allow data to propagate both forward and backward through the network. This recurrent structure may enable temporal context retention, allowing the machine learning model 130 to base predictions not only on the current audio frame but also on preceding frames, which is particularly beneficial for detecting music or speech patterns over time.

During inference, the machine learning model 130 may receive a vector of numerical inputs (e.g., representing audio data) and iteratively transform the vector across its layers using learned weight matrices and nonlinear activation functions (e.g., rectified linear unit, sigmoid, or hyperbolic tangent). Each layer produces an output feature representation that becomes the input to the next layer until the final output layer produces a classification result. For instance, when applied to a raw media item, the machine learning model 130 may output a probability distribution indicating whether the input segment contains copyrighted music, unlicensed background audio, or non-protected content such as speech or ambient noise.

The machine learning model 130 may be executed in software by one or more central processing units (CPUs) or accelerated through specialized machine-learning hardware such as graphical processing units (GPUs), application-specific integrated circuits (ASICs), field-programmable gate arrays (FPGAs), or neuromorphic processors designed to emulate neuronal operations in hardware. Each model configuration may include stored parameter data—such as weight matrices, bias values, and hyperparameters (e.g., number of layers, neuron interconnections, and learning rate)—which may be distributed across control and worker nodes of the remote media sanitization service 115 to enable scalable, parallelized inference.

Implementing machine learning models 130 in this manner may allow the remote media sanitization service 115 to efficiently analyze large-scale media data streams, detect and localize protected content, and support high-throughput sanitization with reduced computational overhead compared to conventional rule-based or manual analysis techniques.

1.35 Data Sources

In some embodiments, the remote media sanitization service 115 may include or be communicatively coupled to one or more data stores 135. The data stores 135 may store data to be processed by the remote media sanitization service 110 as well as any intermediate or final data generated by the remote media sanitization service 115 in non-volatile memory. However, in certain embodiments, the configuration of the remote media sanitization service 115 may allow its operations to be performed such that intermediate and final data results can be stored solely in volatile memory (e.g., RAM), without a requirement that intermediate or final data results be stored to non-volatile types of memory (e.g., disk). This can be useful in certain situations, such as when the remote media sanitization service 115 receives ad hoc queries from a user and when responses, which are generated by processing large amounts of data, need to be generated on-the-fly. In this non-limiting situation, the remote media sanitization service 115 may be configured to retain the processed information within memory so that responses can be generated for the user at different levels of detail as well as allow a user to interactively query against this information.

The data stores 135 may store a variety of different types of data organized in a variety of different ways and from a variety of different sources. For example, the data stores 135 may include storage other than primary storage located within the remote media sanitization service 115 that is directly accessible by processors located therein. The data stores 135 may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals.

Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others.

2.00 Method for Automatically Removing Protected Content from a Raw Media Item

As shown in FIG. 2, a method 200 for automatically removing protected content from a raw media item may include receiving a subscriber-initiated request to remove protected content from a raw media item (S210), detecting one or more acoustic features indicative of protected content within the raw media item (S220), routing the raw media item to an audio sanitization (e.g., separation) service when the one or more acoustic features detected for the raw media item indicate that the raw media item includes one or more protected media assets (S230), separating protected media assets from non-protected portions of the raw media item using one or more audio separation machine learnings (S240), and returning one or more sanitized instance of the raw media item in response to receiving the subscriber-initiated request to remove the protected content from the raw media item (S250).

The systems, methods, computer program products, and embodiments described herein may be implemented in a variety of technology areas where real-time or near real-time processing of user-generated, recorded, or streamed media is needed. Such technology areas may include cloud-based audio processing platforms, automated media sanitization services, streaming content moderation services, digital-rights management and compliance services, and any other suitable computer-implemented application that may need to process audio or media content.

In contrast to conventional systems, the systems, methods, and computer program products described herein may automatically analyze a media item (e.g., media data captured by a recording device (e.g., digital camera, camcorder, or any other suitable electronic device operably configured to capture audio and/or video data)) by running or processing the media item or a representation of the media item through multiple distinct layers of the one or more distinct machine learning models described herein. The multiple distinct layers of the one or more distinct machine learning models, in such systems, methods, and computer program products, may process sequences of video data, audio data, or combinations thereof included within the media item to detect, localize, classify, and/or separate protected content from non-protected content included within the media item or the representation of the media item. That is, in one or more embodiments, the systems, methods, and computer program products described herein may use multiple layers (e.g., machine learning model layers, artificial intelligence (AI) layers, etc.) to detect (e.g., discover, identity, etc.) audio segments, video segments, or combinations thereof that correspond to protected or non-protected regions within the media data. At least one technical benefit of using the one or more distinct machine learning models to process the media item enables the systems, methods, and computer program products described herein to automatically generate at least one transformed instance of the media item that includes the non-protected content detected within the media item while excluding the protected content detected within the media item.

Furthermore, in contrast to conventional systems, the systems, methods, and computer program products described herein may individually or in combination use the one or more distinct machine learning models to automatically sanitize a complex media item (e.g., a media item that includes at least two distinct protected songs occurring simultaneously, a media item that includes at least a portion of a protected song and at least a portion of live speech commentary occurring at a same time, a media item that includes a protected song occurring contemporaneously with non-protected background music, etc.). The systems, methods, and computer program products, in such embodiments, may execute, in sequence or in parallel, the one or more distinct machine learning models described herein to detect and isolate protected and/or non-protected audio data across shared temporal and spectral domains within the complex media item. Processing the complex media item through the one or more distinct machine learning models described herein may provide a technical improvement over conventional systems by enabling accurate localization, detection, and/or separation of simultaneously occurring protected and non-protected content occurring within the complex media item without distorting remaining audio or degrading overall output quality.

For instance, in a non-limiting example, a complex media item may include two distinct protected songs occurring simultaneously within a same time period of an event recording. In such embodiments, the systems, methods, and computer program products described herein may process the complex media item through the one or more distinct machine-learning models to detect, localize, and/or separate each protected song from non-protected audio portions of the event recording. Accordingly, the sanitized instance of the complex media item may include a reconstructed version of the event recording in which the non-protected audio (e.g., live speech commentary, audience reactions, and/or ambient background noise) that occurred within the same time period as the two distinct protected songs is included in the sanitized instance of the complex media item, while the two distinct protected songs are not included in the sanitized instance of the complex media item. Accordingly, at least one technical benefit provided by the systems, methods, and computer program products described herein includes enhancing the accuracy, computational efficiency, and scalability of detecting, localizing, and separating multiple overlapping instances of protected content that occur simultaneously (e.g., contemporaneously) within complex media recordings.

Additionally, in contrast to conventional systems, some embodiments of the systems, methods, and computer program products described herein may minimize or eliminate the need for graphical user interface (GUI) inputs during media sanitization. In such embodiments, the system, method, or computer program product may obtain a media item and, in turn, the system, method, and computer program product automatically performs all required detection, classification, and sanitization operations for the media item without the need for GUI inputs. Such systems, methods, and computer program products provides a technical benefit of improved computational efficiency, as computing resources (e.g., central processing units, graphics processing units, memory, etc.) are allocated directly to automated sanitization processes rather than being consumed by interface-driven operations or manual user interactions. As a result, the disclosed embodiments enable faster, more scalable processing of complex media data while conserving computational resources.

In one or more embodiments, the one or more machine learning models used by the systems, methods, and computer program products described herein comprise extremely large parameter spaces—e.g., hundreds of millions or billions of learnable weights and bias parameters stored across model files that may individually exceed several gigabytes in size. Each forward inference of such models involves high-dimensional tensor operations that multiply, normalize, and aggregate millions of interdependent values to produce intermediate activations across numerous convolutional, recurrent, and attention-based layers. The numerical precision, memory bandwidth, and computational throughput required to perform these operations can only be achieved using specialized computer hardware, such as graphics processing units (GPUs), tensor processing units (TPUs), or other parallel compute architectures. The volume and complexity of these computations render the operations impossible to perform manually or mentally by a human, as a human could not feasibly process or even store the billions of intermediate numerical values required to generate a single inference output. Furthermore, in some embodiments, these inferences are computed in real time, near real time, and/or contemporaneously with other inferences—e.g., within approximately one to three seconds of receiving a raw media item—such that the system can detect, localize, classify, and separate protected content from non-protected content nearly instantaneously as the content is streamed or uploaded. The magnitude, interdependence, and computational speed of these processes perform specialized computer-implemented operations far beyond the capabilities of human cognition or manual analysis.

In some embodiments, the systems, methods, and computer program products described herein may generate and use synthetic audio composites that collectively achieve a target level of diversity across acoustic, temporal, and environmental dimensions. Each synthetic audio composite may combine protected and non-protected audio sources (e.g., speech, crowd noise, environmental sound, and music) under different simulated conditions to emulate real-world recordings with overlapping content. The system may vary or augment parameters such as signal-to-noise ratio, sound pressure level, frequency balance, and spatial reverberation to ensure that no two generated composites are identical. These variations may collectively contribute to a synthetic corpus that spans a broad distribution of sound environments, including indoor and outdoor venues, quiet and noisy conditions, and both live and production-style mixes.

In some embodiments, the disclosed system may continue generating synthetic audio composites until a diversity threshold is satisfied. The diversity threshold may be met when the generated corpus exhibits sufficient variation across recording environments, protected-content categories, and content overlaps to ensure robust model generalization. For instance, the diversity threshold may be achieved when a target number of distinct synthetic samples (e.g., 10,000 or more) collectively represent hundreds of unique combinations of acoustic conditions and impulse-response environments. Once this diversity threshold is reached, the resulting corpus may be used to train or fine-tune the machine learning models described herein, thereby ensuring that the models are capable of accurately detecting, localizing, and separating protected content under varied and previously unseen recording conditions.

This synthetic data generation processes described herein may provide several technical benefits. Because the system can produce high-fidelity, labeled audio composites within seconds, it may continuously expand the training dataset as new conditions or source types arise, without requiring manual annotation or copyrighted material. The synthetic corpus may also ensure balanced exposure to both live and production content, allowing the trained models to learn distinguishing patterns across those domains. Accordingly, the disclosed synthetic data generation framework may provide a technical improvement to computer-implemented audio processing by enabling rapid, diverse, and scalable model training that conventional real-data-only systems cannot achieve due to limited availability and labeling precision.

Once trained on this diverse synthetic corpus, the machine learning models described herein may generate, during or derived from inference, a protected-content segmentation heat map representing the presence and temporal localization of protected content within a media item. The protected-content segmentation heat map may visually or programmatically represent time-indexed probabilities or confidence scores indicating where protected content occurs. Each region of the heat map may correspond to a time interval of the media item and may be encoded with a color, intensity value, or numerical score that reflects the model's confidence that protected content is present within that interval. The segmentation heat map may therefore serve as a detailed temporal index that enables downstream systems or interfaces to rapidly identify, retrieve, and process the precise segments of a recording that contain protected material.

The generation and use of the protected-content segmentation heat map may provide several technical advantages. In some embodiments, the heat map may enable a media playback element to automatically navigate to and begin playback from a first detected instance of protected content within a media item, thereby reducing or eliminating the need for manual user input to locate such regions. Upon completion of playback of a first protected segment, the system may automatically advance to a subsequent detected instance of protected content or, alternatively, skip over protected intervals to resume playback of non-protected portions of the media item. This automated navigation may allow a user to efficiently review only the relevant time segments without manually searching or scrubbing through the entire recording.

In some embodiments, the protected-content segmentation heat map may additionally provide a visual representation of where protected content occurs within the media item. For example, the system may render a timeline, waveform, or other visual interface in which protected regions are highlighted according to a confidence value or intensity gradient. This visualization may allow a user to quickly assess the distribution, duration, and density of protected content across the entire media file at a glance, without the need for sequential playback. In some implementations, the user interface may further support direct interaction—such as clicking, tapping, or selecting a highlighted region—to initiate playback, review, or removal operations from the corresponding point in time.

In some embodiments, the protected-content segmentation heat map and associated machine learning outputs may be used as part of an automated middleware layer between a content management system and a social media or publishing platform. For example, the disclosed systems, methods, and computer program products may be deployed as an intermediary service that receives a media item before it is uploaded or distributed, analyzes the media item to determine whether protected content is present, and automatically triggers a blocking or hold action if protected material is detected. In such embodiments, the system may prevent posting, streaming, or publication of the media item until a sanitization or review process confirms that the protected content has been removed or authorized.

In other embodiments, the methods and systems described herein may be used as a scanning or compliance tool for already-published content, the system may automatically trigger a takedown action or send an alert to a content administrator upon detecting protected content in an active post or media stream. For example, upon detecting a high-confidence instance of protected content, the system may generate an event record or API call that instructs a connected platform to disable playback, mute the affected segment, or temporarily remove the post pending review. These automated integrations may operate without requiring user intervention and may execute in near real time, thereby allowing large-scale platforms to maintain continuous compliance with copyright or licensing requirements.

In some embodiments, the systems, methods, and computer program products described herein may further analyze a media item to determine whether any detected music corresponds to live music or production music, and may generate a corresponding safety label or compliance indicator based on that determination. Production music, as used herein, may refer to studio-recorded or intentionally added tracks that the subscriber or rights holder has licensed or authorized for distribution. Live music, by contrast, may refer to audio that has been reproduced through a speaker system and subsequently captured by a microphone in a real-world setting (e.g., a song played over stadium loud-speakers or background music recorded during an event).

In some embodiments, when the system identifies production music within a media item, the corresponding portion—or the media item as a whole—may be automatically labeled as safe, cleared, or authorized, indicating that the content may remain available for distribution or publication. Conversely, when live music is detected, the affected portions or the entire media item may be labeled as unsafe, unverified, or restricted, indicating that the content may require sanitization or review prior to release. These safety labels may be generated in real time and stored in association with time-indexed metadata identifying the corresponding regions of the media item, or may be assigned globally when the system determines that the majority or entirety of the media item contains live or unlicensed content.

In some embodiments, the system may automatically use these safety labels to control downstream operations. For example, a media item labeled as unsafe may be automatically blocked from upload, playback, or posting to a connected social-media or content-management platform, while a media item labeled as safe may be automatically approved for publication without requiring manual review. When deployed as a scanner or monitoring service, the system may automatically initiate a takedown or muting action for previously published media items labeled as unsafe, while maintaining availability for those labeled as safe.

In some embodiments, the systems, methods, and computer program products described herein may route only time-indexed portions of a media item that are predicted to contain protected content to one or more separation models. The protected-content segmentation heat map may be converted into a sparse, time-indexed mask (e.g., a list of start/stop timestamps with optional confidence scores). Using this mask, the system may extract just the corresponding audio windows (optionally with padding for context) and enqueue those windows to the separation service, while bypassing non-protected intervals. This segment-directed flow may be implemented for both file-based and streaming inputs using windowed buffering with overlap-add reconstruction so that only relevant frames are represented in memory.

Such selective routing may provide measurable improvements to computer components and resources. By avoiding full-file inference, the system may (i) reduce CPU utilization for decoding, resampling, and feature extraction; (ii) lower GPU utilization and VRAM footprint by batching only the masked windows, enabling larger batch sizes or higher-resolution models within the same memory budget; (iii) decrease system memory usage by discarding unneeded intermediate tensors for non-protected regions; and (iv) cut disk and network I/O, since only targeted segments are read, copied, or transmitted to microservices. In some implementations, zero-copy slicing and pinned-memory DMA transfers may further reduce copy overhead between host and device, and kernel launch counts may drop proportionally to the number of skipped windows, improving end-to-end latency.

2.10 Receiving a Subscriber-Initiated Request to Remove Protected Content From a Raw Media Item S210, which includes receiving a subscriber-initiated request, may function to receive one or more subscriber-initiated requests to remove protected content from one or more raw media items. A raw media item, as generally used herein, may refer to an audio, video, or audio-video recording comprising unprocessed media data captured from an event. For example, in some embodiments, S210 may function to receive a subscriber-initiated request to remove protected content from a sports recording captured during a live sporting event (e.g., a basketball game, soccer match, or hockey game). Additionally, or alternatively, S210 may function to receive a subscriber-initiated request to remove protected content from other types of events, such as a concert performance, a cruise event, a live-streamed interview, a press conference, a podcast episode, and/or the like.

In some embodiments, audio data within a raw media item may include protected audio data and non-protected audio data. Protected audio data, as generally used herein, may refer to music present in the raw media item that a subscriber does not own or have authorization to redistribute. Examples of a raw media item including protected audio data may include, but should not be limited to, a sports clip containing an unlicensed song or music played through stadium speakers, a concert recording capturing a live performance of a copyrighted song, a cruise video capturing unlicensed music played in a public venue, or a live-streamed interview recorded in an environment where copyrighted songs are audibly present.

Alternatively, non-protected audio data within a raw media item may refer to audio that does not contain (e.g., is free of) copyrighted or licensed material for which the subscriber lacks redistribution rights. Examples of a raw media item including non-protected audio data may include, but should not be limited to, speech or commentary recorded by a subscriber, crowd noise, sports sounds (e.g., gameplay sounds), environmental sounds, or other naturally occurring audio captured during an event. Additional examples of non-protected audio data may include audio content that the subscriber is legally authorized to use or redistribute (e.g., music or other copyrighted data covered by a license obtained by the subscriber).

Figure 5:
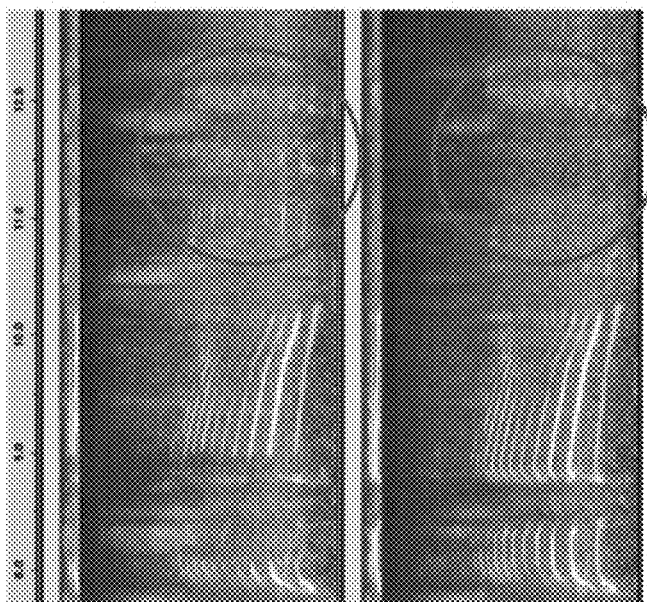
FIG. 5 illustrates a visual representation of an audio fingerprint in accordance with one or more embodiments of the present application.

In some embodiments, the protected audio data and the unprotected audio data may overlap in time within the raw media asset, as generally illustrated at the top of FIG. 5. For example, background music or a copyrighted song (e.g., protected audio data) may occur and/or play simultaneously with commentator speech, crowd reactions, or other ambient sounds (e.g., non-protected audio data) during a live event recording. It shall be noted that the overlap between the protected and non-protected audio data may vary in duration or audio intensity depending on the recording environment or source of capture.

Ingesting Raw Media Items

Figure 4A:
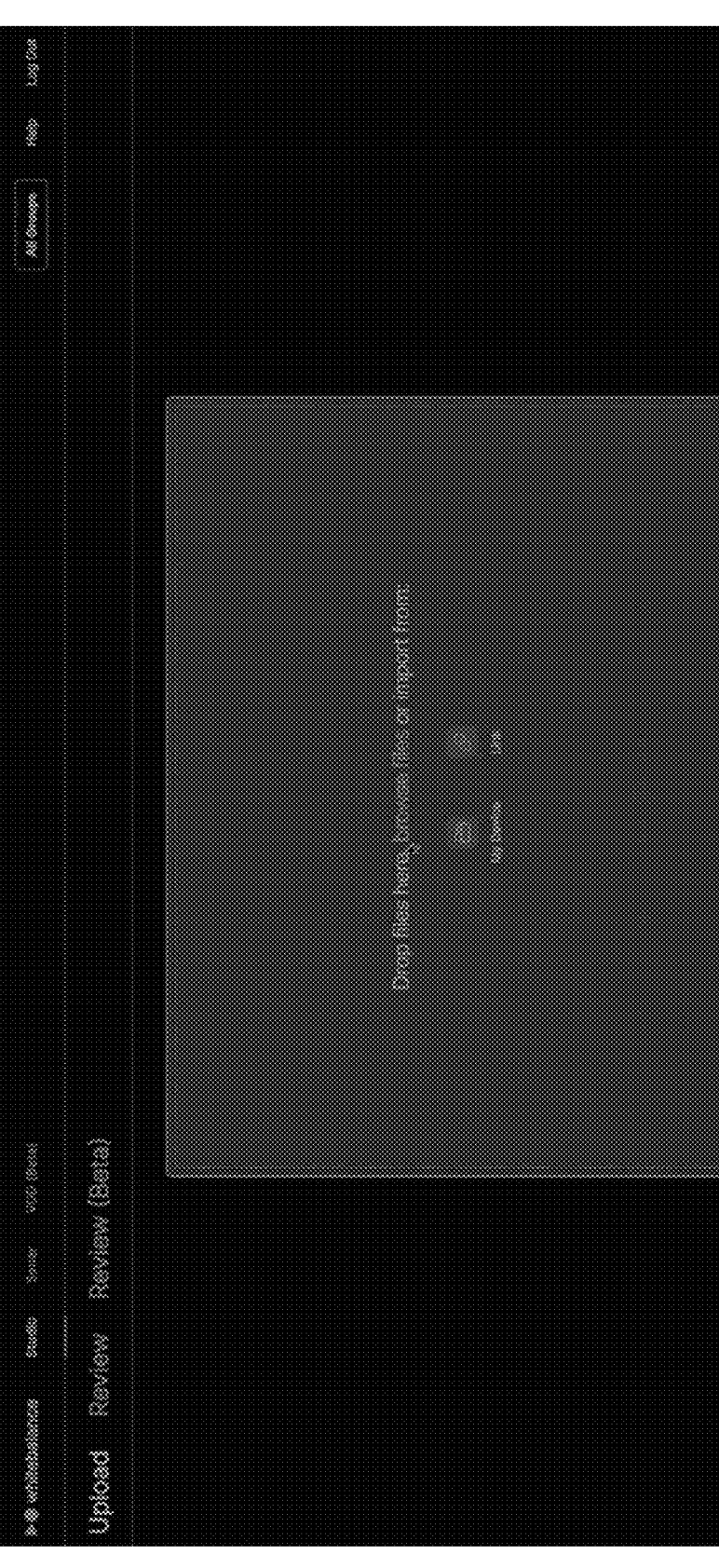
FIGS. 4A-4F illustrate example graphical user interfaces in accordance with one or more embodiments of the present application.

In some embodiments, S210 may be configured to ingest a raw media item via one or more interfaces or integration channels accessible by a subscriber. The one or more interfaces or integration channels accessible to the subscriber may include, but should not be limited to, a graphical upload user interface, an application programming interface, a messaging service integration, and/or an automated social feed scanning service. The graphical upload user interface of S210, as generally illustrated in FIG. 4A, may include selectable user interface objects that are configured to receive subscriber inputs corresponding to a selection, upload, or import of one or more raw media items. For example, in some embodiments, the graphical user interface may include a selectable upload button, a drag-and-drop region, and/or an import control for retrieving one or more raw media items (e.g., media files or links) from an external source. In response to user activation of one of the selectable user interface objects, S210 may initiate ingestion of the one or more raw media items, store the ingested raw media items in computer memory, and generate a corresponding request to remove protected content from each of the ingested raw media items.

Additionally, or alternatively, S210 may ingest one or more raw media items from a messaging service (e.g., Slack, Microsoft Teams, or other workspace communication channels). In such embodiments, S210 may be configured to monitor designated channels or message threads for one or more raw media items (e.g., shared media files or links). In response to detecting raw media items shared within one of the designated channels or message threads, S210 may automatically retrieve or download the raw media items and generate a corresponding subscriber-initiated request to remove protected content from each retrieved or downloaded raw media item.

Furthermore, in some embodiments, S210 may ingest one or more raw media items via an automated social feed scanning service. The automated social feed scanning service may operate to continuously monitor one or more subscriber-linked social media accounts for new published or updated posts containing audio, video, or audio-video content (e.g., raw media items). Upon detecting a new or modified post, S210 may automatically ingest the raw media item(s) included in the new or modified post and generate a subscriber-initiated request to remove protected content from the raw media item(s).

It shall be noted that, in some embodiments, a raw media item ingested by S210 may include video data synchronized with corresponding audio data. The video data may visually depict scenes or events occurring during the same time period as the audio data, such as sport scenes (e.g., game footage), live performances, interviews, or environmental scenes. In such embodiments, the audio data may play concurrently with the video data during playback of the raw media item. For instance, fan noise (e.g., crowd reactions) or commentator speech may be temporally aligned with video of player movements, while protected content (e.g., unlicensed music) may play continuously or intermittently throughout the raw media item.

2.20 Detecting Acoustic Features of the Raw Media Item

S220, which includes detecting acoustic features, may function to detect one or more acoustic features indicative of protected content within a raw media item. In some embodiments, S220 may route the raw media item to an audio recognition service to detect the one or more acoustic features (e.g., feature vectors) of the raw media item. An audio recognition service, as generally used herein, may refer to a sub-system or a microservice of a remote media sanitization service (e.g., system 100).

Figure 3:
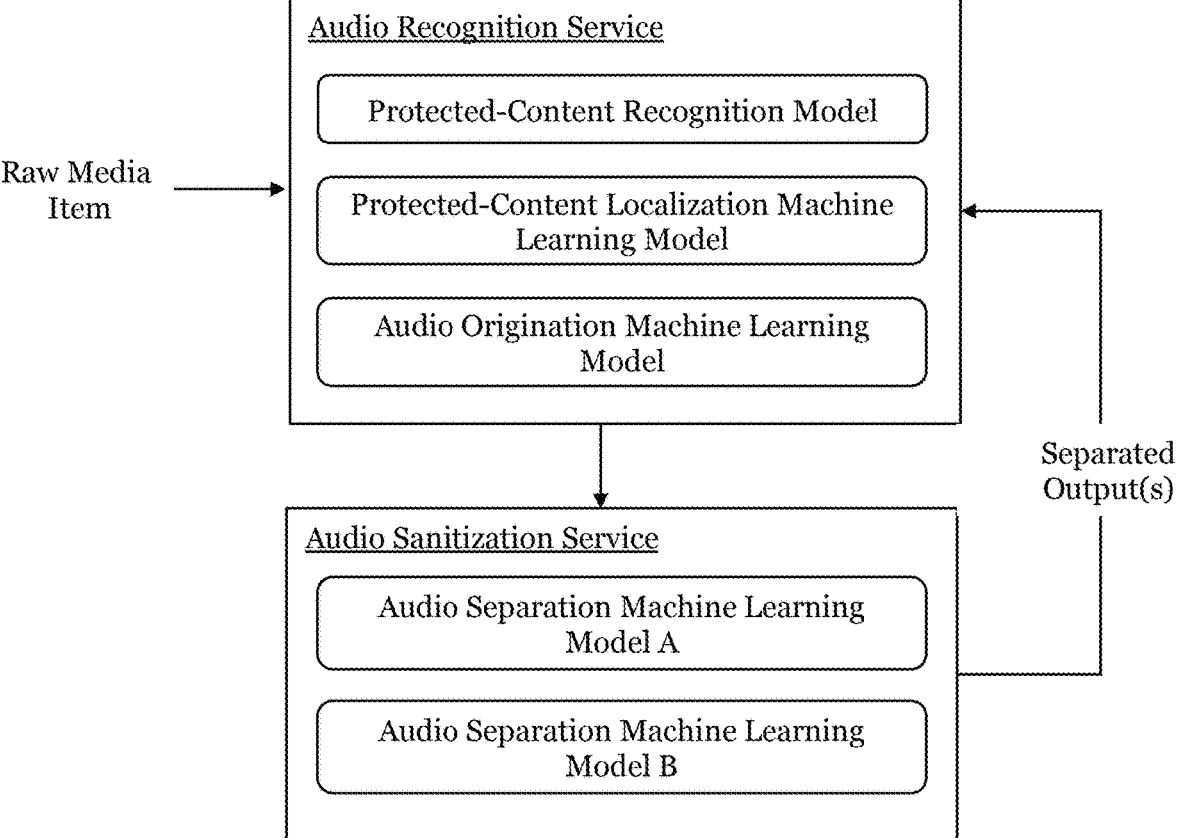
FIG. 3 illustrates one or more machine learning models implemented by an audio recognition service and an audio sanitization service in accordance with one or more embodiments of the present application.

In some embodiments, in response to receiving the raw media item, S220 may concurrently route the raw media item to a plurality of trained audio recognition models (e.g., trained protected content recognition models). The plurality of trained audio recognition models, as illustrated in FIG. 3, may include a protected-content recognition model (e.g., a song recognition model that detects one or more songs present in the raw media item), a protected-content localization machine learning model (e.g., a music localization machine learning model that localizes where sounds occur in the raw media item), and/or an audio origination machine learning model (e.g., a music classification machine learning model that classifies sounds of the raw media item into one or more origination categories, such as live music or production music, without detecting a precise location of the classified sounds within the raw media item). As described in more detail below, in response to routing the raw media item to each of the plurality trained audio recognition models, the audio recognition service may concurrently execute each of the trained audio recognition models to detect one or more distinct acoustic features of the raw media item.

Protected-Content Recognition Model|Song Recognition

In some embodiments, the protected-content recognition model (e.g., machine learning model) may be configured to receive a raw media item as input. In response to receiving the raw media item, the protected-content recognition model may detect a presence of one or more protected media assets (e.g., protected audio data) within the raw media item. It shall be noted that the term "protected media asset" may be interchangeably used herein with the term "song," and/or may refer to any copyrighted or licensed audio recording that a subscriber does not have authorization to redistribute.

In some embodiments, detecting the presence of the one or more protected media assets in the raw media item may include outputting (e.g., generating) song recognition data. The song recognition data may include a set of one or more songs detected within the raw media item (e.g., Song A, Song B, . . . , Song N). The song recognition data may further include song metadata for each detected song within the raw media item. The song metadata for a detected song may include, but should not be limited to, a name of the detected song, a band name or artist associated with the detected song, one or more timestamps (e.g., start and/or end times) indicating where the detected song occurs within the raw media item, an indicator specifying whether the respective song is licensed or unlicensed for use by the subscriber, and a confidence score generated by the protected-content recognition model that indicates a level of predictive confidence that the one or more timestamps associated with the raw media includes the detected song.

An example of song metadata associated with Song A may include a song name (e.g., "Song A"), a band name or artist (e.g., "Band A"), one or more timestamps indicating where Song A occurs within the raw media item (e.g., 00:12-00:24), an indicator indicating whether Song A is licensed or unlicensed for use by the subscriber (e.g., "Unlicensed" or "Potentially Unlicensed"), and/or a confidence score (e.g., 79%). Similarly, song metadata associated with Song B may include a song name (e.g., "Song B"), a band name or artist (e.g., "Band B"), one or more timestamps indicating where Song B occurs within the raw media item (e.g., 00:05-00:14 and 00:27-00:45), an indicator indicating whether Song B is licensed or unlicensed for use by a subscriber (e.g., "Licensed"), and/or a confidence score (e.g., 99%).

In some embodiments, the protected-content recognition model may determine whether each detected song is licensed or unlicensed by electronically searching one or more licensing data sources associated with a subscriber. For example, the protected-content recognition model may construct a search query comprising a name or identifier of each song detected by the protected-content recognition model as search parameters. The protected-content recognition model may then execute the search query against the one or more licensing data sources to determine whether a subscriber has an active license to each detected song specified in the search parameters. If the one or more licensing data sources associated with a subscriber includes a license entry for a respective song specified in the search parameters, the search query may return a record for that respective song containing associated license information (e.g., license identifier, rights holder, license term, expiration date, and permitted usage scope).

Conversely, if the one or more licensing data sources associated with a subscriber does not include a license entry corresponding to a respective song specified in the search parameters of the search query, the search query may return no matching licensing entry for that respective song. It shall be noted that, the one or more licensing data sources may be determined to include a license entry corresponding to a respective song when the name or identifier of the respective song matches (e.g., exactly matches or fuzzy matches) a value within a song column of a license entry stored within the licensing data sources.

Accordingly, if the search query returns a license entry for a detected song in the raw media item, the protected-content recognition model may classify the detected song as licensed and, in turn, generate (e.g., output) song recognition data for the detected song that at least includes a license status indicator identifying the respective detected song as licensed. Conversely, if the search query does not return a license entry for a detected song in the raw media item, the protected-content recognition model may classify the detected song as unlicensed or potentially unlicensed and, in turn, generate (e.g., output) song recognition data for the detected song that at least includes a license status indicator identifying the respective detected song as unlicensed or potentially unlicensed.

Audio Fingerprint Digital Signal Processing Model

In some embodiments, the protected-content recognition model may be an audio fingerprint digital signal processing model. In such embodiments, in response to receiving the raw media item, the protected-content recognition model may generate an audio fingerprint vector that numerically encodes spectral and temporal characteristics of the audio data within the raw media item. In particular, as generally illustrated in the top portion of FIG. 5, the audio fingerprint vector may correspond to a time-frequency representation (e.g., a spectrogram) that depicts a strength of different sound frequencies in the raw media item over time.

The protected-content recognition model may then detect one or more spectral peaks in the time-frequency representation (e.g., a dominant tonal element within the time-frequency representation). Each detected spectral peak may be defined by a set of parameters including an associated time within the raw media asset, a frequency coordinate, and an amplitude value. Thus, a collection of the one or more spectral peaks may represent a compact representation of the most perceptually and structurally significant portions of the audio data associated with the raw media item while discarding less informative background noise (or lower frequency) components.

In some embodiments, the protected-content recognition model may generate a plurality of time-frequency pairs based on the one or more spectral peaks in the time-frequency representation. The plurality of time-frequency pairs may be generated by associating each detected spectral peak with one or more additional spectral peaks occurring within a pre-defined temporal window (e.g., 1, 2, 3, 4, 5, 10, 20, 30, etc. seconds). Thus, each generated time-frequency pair may capture both a frequency relationship (e.g., a difference in frequency values between two respective spectral peaks) and a temporal relationship (e.g., a time interval separating the two respective spectral peaks in the raw media item). The protected-content recognition model may then convert each of the plurality of time-frequency pairs into a numerical encoding, sometimes referred to herein as a fingerprint hash, that numerically represents the frequency relationship and temporal relationship between a pair of spectral peaks. It shall be noted that, in some embodiments, the fingerprint hash of each time-frequency pair may collectively form the audio fingerprint vector of the raw media item.

In some embodiments, the protected-content recognition model may construct a protected-content search query that includes the audio fingerprint vector of the raw media item as a search parameter. The protected-content search query may be executed against a protected-content fingerprint repository comprising a plurality of protected-content fingerprint vectors generated for a target corpus of protected content (e.g., a library of copyrighted or licensed songs). The protected-content recognition model may assess the fingerprint hash of each time-frequency pair generated for the raw media item to fingerprint hashes of each protected-content fingerprint vector in the protected-content fingerprint repository. A fingerprint match may be detected when at least one fingerprint hash of the raw media item corresponds to at least one fingerprint hash in a protected-content fingerprint vector such that the frequency relationship and temporal relationships associated with each fingerprint hash fall within a predefined tolerance range.

In response to detecting a fingerprint match, the protected-content recognition model may classify a portion of the raw media item (e.g., the portion of the raw media item corresponding to the time value(s) associated with the matching fingerprint hashes) as containing a protected media asset. The protected-content recognition model may then generate song recognition data for each detected fingerprint match in analogous ways described above. For example, for each detected fingerprint match, the song recognition data may include a name or identifier of the unlicensed song associated with the fingerprint hashes of the protected-content fingerprint vector and one or more timestamps (e.g., time segments) indicating the times associated with the matching fingerprint hashes in the raw media item.

Protected-Content Localization Machine Learning Model|Music Detection Machine Learning Model In some embodiments, the protected-content localization machine learning model may be configured to receive a raw media item as input. In response to receiving the raw media item, the protected-content localization machine learning model (and/or the protected-content recognition model) may detect if one or more protected media assets are present in the raw media item. If a presence of one or more protected media assets is detected within the raw media item, the protected-content localization machine learning model may additionally detect one or more time-indexed segments of the raw media item in which the one or more protected media assets temporally occur within the raw media item. A time-indexed segment of the raw media item, as generally used herein, may refer to a discrete portion of the raw media item that is defined by a respective start time and an end time.

In some embodiments, detecting if one or more protected media assets are present in the raw media item may include detecting if music is present in the raw media item. The protected-content localization machine learning model may detect music in the raw media item in accordance with a subscriber-defined temporal resolution. For example, if the subscriber-defined temporal resolution is set to one (1) second, the protected-content localization machine learning model may generate a music presence prediction (e.g., inference) for every one second portion or interval of the raw media item. It shall be noted that the above example is not intended to be limiting and that the subscriber-defined temporal resolution may be higher (e.g., 2, 3, 4, 5, 6, etc. seconds) or lower (e.g., 100, 200, 300, 400, etc. milliseconds) than one (1) second without departing from the scope of the disclosure.

For instance, in a non-limiting example, the protected-content localization machine learning model may receive a raw media item comprising two (2) minutes of audio data. If the subscriber-defined temporal resolution is set to one second, the protected-content localization machine learning model may generate one hundred and twenty (120) music-presence inferences. For example, a first music-preference inference may correspond to a time-indexed segment of the raw media item beginning from 0 seconds and ending at 1 second, a second music-preference inference may correspond to a time-indexed segment of the raw media item beginning from 1 second and ending at 2 seconds, a third music-preference inference may correspond to a time-indexed segment of the raw media item beginning from 2 seconds and ending at 3 seconds, and so on, until a one hundred and twentieth music-presence inference, which may correspond to a time-indexed segment starting at 119 seconds and ending at 120 seconds.

In some embodiments, each of the music-presence inferences may include a music probability value ranging from 0.0 to 1.0 that represent a likelihood that the corresponding portion of the raw media item contains music. A higher music probability value may indicate greater predictive confidence by the protected-content localization machine learning model that a corresponding time-indexed segment of the raw media item includes music, whereas a lower music probability value may indicate reduced predictive confidence by the protected-content localization machine learning model that the corresponding time-indexed segment of the raw media item contains musical content.

Once all music-presence inferences have been generated across the duration of the raw media item, the protected-content localization machine learning model may assess each music-presence inference against a music detection threshold (e.g., 0.5, 0.6, 0.7, 0.8, etc.). Portions of the raw media item that correspond to music probability values greater than or equal to the music detection threshold may be classified as music-positive segments (e.g., time indexed segments that include music), while portions having values below the music detection threshold may be classified as non-music segments (e.g., time indexed segments that do not include music).

Architecture of the Protected-content Localization Machine Learning Model

In some embodiments, the protected-content localization machine learning model may include a plurality of neural network layers configured to extract spectral-temporal features from the raw media item and generate music presence inferences/predictions according to a subscriber-defined temporal resolution. The protected-content localization machine learning model may include, in order, a convolutional feature extraction stage, a temporal sequence modeling stage, and an output classification stage. The convolutional feature extraction stage may include a series of two-dimensional convolutional layers, normalizations, and activations that progressively compress data (e.g., the inputted raw media item) into a latent space. For instance, in a non-limiting example, the series of two-dimensional convolutional layers, normalizations, and activations may include one or more two-dimensional convolutional layers (e.g., five, ten, twenty, thirty, etc. convolutional layers), each followed by a normalization (e.g., batch normalization or group normalization) and an activation function (e.g., a rectified linear unit (ReLU)). Each convolutional layer in the series of two-dimensional convolutional layers may apply progressively larger receptive fields and strided kernels, and/or pooling operations to the input raw media item to extract local spectral-temporal feature maps indicative of musical content, such as harmonic continuity, rhythm periodicity, and timbral energy distribution.

The temporal sequence modeling stage may include one or more bidirectional gated recurrent unit (Bi-GRU) layers (e.g., two, three, four, five, or more Bi-GRU layers), one or more rotary positional embedding (RoPE) transformers, and/or one or more RoPE conformer modules (e.g., modules that combine self-attention and convolutional operations), each configured to process the local spectral-temporal feature maps output from the convolutional layers and capture temporal dependencies between consecutive time-indexed segments in both forward and backward time directions. Additionally, in some embodiments, the protected-content localization machine learning model may include a linear projection layer between the two-dimensional convolutional layers (e.g., CNN network) and the temporal modeling portions of the model network. The linear projection layer may align tensor dimensions (e.g., feature maps) between the feature exaction and temporal modeling stages.

The output classification stage may include a fully connected layer followed by a sigmoid activation function (or any other suitable activation function) that produces a normalized music probability value between 0.0 and 1.0 for each time-indexed segment, as described above. In some embodiments, a temporal smoothing filter (e.g., a moving average or median filter) may be applied to the output sequence of probability values to reduce short-term fluctuations in detected music regions.

Audio Origination Machine Learning Model|Live Music vs. Production Music Classification Model In some embodiments, the audio origination machine learning model may include one or more characteristics (e.g., architecture and/or predictive characteristics) analogous to the protected-content localization machine learning model. For example, the audio origination machine learning model may detect if one or more protected media assets are present in the raw media item in the same or similar ways as the protected-content localization machine learning model. Furthermore, if the audio origination machine learning model detects the presence of one or more protected media assets in the raw media item, the audio origination machine learning model may detect one or more time-indexed segments (e.g., temporal segments) of the raw media item that indicate where the one or more protected media assets temporally occur in a same or similar way as the protected-content localization machine learning model.

Moreover, in addition to computing a music-presence inference for each time-indexed segment of the raw media item (e.g., in the same or similar way as the protected-content localization machine learning model), the audio origination machine learning model may compute an audio origination inference for each time-indexed segment of the raw media item. It shall be noted that, in some embodiments, the audio origination machine learning model may not compute or couple an audio origination inference for any time-indexed segment that has already been classified as a non-music segment. Accordingly, in some embodiments, the audio origination machine learning model may only compute audio origination inferences for time-indexed segments classified as a music-positive segment. It shall be noted that, in some embodiments, only the audio origination inference(s) may be computed by the audio origination machine learning model (not the music-presence inference(s)).

In some embodiments, an audio origination inference generated for a respective time-indexed segment of the raw media item may indicate an audio origination source (e.g., classification label) associated with that respective time-indexed segment. The audio origination source, in some embodiments, may indicate whether the respective time-indexed segment of the raw media item corresponds to live music (e.g., a first audio origination classification label) or production music (e.g., a second audio origination classification label).

For instance, in a non-limiting example, an audio origination inference generated for a time-indexed segment of the raw media item beginning at 0 seconds and ending at 1 second may indicate that the audio origination source of the music within that time-indexed segment corresponds to live music. Similarly, audio origination inferences respectively generated for subsequent time-indexed segments beginning at 1 second and ending at 2 seconds, 2 seconds and ending at 3 seconds, and so on, up to 30 seconds, may also indicate that the corresponding time-indexed segments contain live music. In contrast, time-indexed segments beginning at 31 seconds and ending at 35 seconds may not have corresponding audio origination inferences, as those segments may have been classified as non-music segments by the protected-content localization machine learning model (or the audio origination machine learning model). Moreover, audio origination inferences generated for time-indexed segments beginning at 36 seconds and ending at 37 seconds, 37 seconds and ending at 38 seconds, and so on, up to 120 seconds, may indicate that the corresponding segments comprise production music.

Accordingly, in this non-limiting example, the sequence of audio origination inferences may collectively indicate a transition within the raw media item from a live music portion (e.g., 0-30 seconds), to a non-music portion (e.g., 31-35 seconds), to a production music portion (e.g., 36-120 seconds). It shall be noted that live music, as generally used herein, may refer to music that has been reproduced through one or more speakers and subsequently captured or recorded via a microphone in a live or uncontrolled environment. Examples of live music may include, but should not be limited to, music played through stadium speakers and captured in a sports broadcast, music played through a vehicle stereo and recorded on a mobile device, or music emitted from a public sound system and captured in a crowd or venue recording.

Conversely, production music, as generally used herein, may refer to studio-quality music that has been directly incorporated into the raw media item without being reproduced and re-recorded through an external playback system. Examples of production music may include, but should not be limited to, pre-mixed or mastered audio tracks added to a sports broadcast as intro or outro music before a commercial, or a highlight reel accompanied by a synchronized background track. In some embodiments, the audio origination machine learning model may further detect instances in which live music and production music occur simultaneously within the same time-indexed segment of the raw media item (e.g., when music played through stadium speakers during a live event overlaps with outro/exit music added during a broadcast transition to an advertisement).

In some embodiments, a music label may be derived by S220. For example, S220 may derive a music label based on one or more audio-origination inferences generated by the audio origination machine learning model for each time-indexed segment of the raw media item. In certain embodiments, when the audio origination inference indicates an origination class corresponding to live music or production music, S220 may derive a music-positive label for that segment (e.g., a binary or categorical indicator denoting that the segment includes music content, such as a "1" or "music" label).

Generating Synthetic Audio Composites for Model Training

In some embodiments, S220 may train one or more of the above-described models using a plurality of synthetic audio composites. A synthetic audio composite, as generally used herein, may refer to an artificially generated audio sample that combines multiple audio sources to simulate real-world recording conditions. For example, in some embodiments, a synthetic audio composite may include a combination or mixture of protected content (e.g., copyrighted or licensed music) and non-protected content (e.g., speech audio, crowd noise, environmental sounds, etc.). Each synthetic audio composite may be generated to emulate (complex) auditory environments in which protected and non-protected content overlap or transition over time, thus enabling the above-described models to learn to distinguish and localize protected media assets under varied acoustic conditions.

It shall be noted that, in some embodiments, it may be necessary for S220 to train the above-described machine learning models using synthetic audio composites due to a limited availability of labeled real-world recordings that accurately represent diverse combinations of protected and non-protected content.

Obtaining and Augmenting Audio Data

In some embodiments, generating a plurality of synthetic audio composites may include obtaining a corpus of protected audio content from a protected-content repository. The protected-content repository, as generally used herein, may refer to a digital storage system or database that stores one or more protected audio files (e.g., protected audio content). Each protected audio file stored in the digital storage system may correspond to a distinct copyrighted or licensed recording (e.g., a commercial music track, soundtrack excerpt, promotional jingle, etc.) and may include associated metadata identifying attributes of the distinct copyrighted or licensed recording (e.g., a song name, artist or band name, a rights holder, a license identifier, a license term, a unique content identifier, etc.).

In some embodiments, the corpus of protected audio content obtained from the protected-content repository may include all or a subset of the protected audio files stored in the protected-content repository. The subset of protected audio files may be (randomly) selected from the protected-content repository according to one or more sampling criteria, such as audio genre, tempo range, duration, instrumentation, or license type, to ensure representative diversity across different categories of copyrighted or licensed recordings.

Additionally, in some embodiments, generating the plurality of synthetic audio composites may include obtaining a corpus of event noises from an event sound repository. The event sound repository, as generally used herein, may refer to a digital storage system or database that stores event noise audio files corresponding to a distinct environmental or event-related sound. Each event noise file stored in the event sound repository may represent real-world auditory elements that occur during public or live events (e.g., sports games, concerts, press conferences, interviews, or outdoor gatherings) and/or may include, but should not be limited to, speech audio, crowd reactions, ambient environmental noise, gameplay sounds, and/or the like.

In some embodiments, the corpus of event noises obtained from the event sound repository may include all or a subset of the event noise audio files stored in the event sound repository. The subset of event noise files may be (randomly) selected based on one or more sampling criteria, such as event type, noise density, average sound pressure level, or dominant frequency range, to ensure diverse coverage of real-world acoustic backgrounds.

Random Sampling and Audio Augmentation

In some embodiments, generating the plurality of synthetic audio composites may include randomly sampling one or more protected audio segments from the corpus of protected audio content and one or more event noise segments (e.g., files) from the corpus of event noises. After randomly sampling the one or more protected audio segments and the one or more event noise segments, generating the plurality of synthetic audio composites may further include executing one or more audio augmentation operations on the one or more protected audio segments and the one or more event noise segments.

The one or more audio augmentation operations, in some embodiments, may convert (e.g., transform) the one or more protected audio segments into one or more augmented protected audio segments and the one or more event noise segments to one or more augmented event noise segments. In some embodiments, converting a respective protected audio segment to an augmented protected audio segment may include executing an audio augmentation operation that removes one or more low frequencies from the respective protected audio segment such that the resulting augmented protected audio segment exhibits a narrow spectral range relative to the respective protected audio segment.

Additionally, or alternatively, converting a respective protected audio segment to an augmented protected audio segment may include executing an audio augmentation operation that adds one or more low, mid, or high frequencies to the respective protected audio segment such that the resulting augmented protected audio segment exhibits a higher spectral range relative to the respective protected audio segment. S220 may execute the same or similar audio augmentation operations to convert the one or more event noise segments to one or more augmented event noise segments. It shall be noted that the above-described examples are not intended to be limiting and that S220 may execute additional or different audio augmentation operations without departing from the scope of the disclosure, such as frequency filtering, amplitude scaling, reverberation convolution, time stretching or compression, pitch shifting, dynamic range compression, and/or noise injection.

Impulse-Response Environment Modeling

Additionally, in some embodiments, generating the plurality of synthetic audio composites may include randomly sampling an impulse-response environment file from an impulse-response environment library. The impulse-response environment library, as generally used herein, may refer to a digital storage repository comprising one or more impulse-response files. Each impulse-response file stored in the impulse-response environment may refer to a recorded or simulated acoustic measure of a distinct physical environment (e.g., a stadium, concert hall, gymnasium, theater, office, or outdoor venue). In particular, each impulse-response file may represent acoustic characteristics of a physical environment (e.g., the acoustic DNA of that physical environment), including how sound waves propagate, reflect, and decay over time within that physical environment. Such acoustic characteristics may include, but should not be limited to, reverberation time, frequency-dependent absorption, diffusion, and spatial reflection patterns caused by surrounding surfaces and materials.

It shall be noted that the "impulse" of the impulse-response file may correspond to an acoustic excitation event (e.g., gunshot, etc.), while the "response" of the impulse-response file may correspond to the subsequent reflections, reverberations, echoes, and/or the like as the acoustic excitation event interacts within a distinct physical environment.

After sampling an impulse-response environment file from the impulse-response environment library, generating the plurality of synthetic audio composites may further include convolving each of the one or more augmented protected audio segments and/or the one or more augmented event noise segments with the impulse-response file. Convolving, as generally used herein, may refer to a computer-executed operation that combines each input audio segment (e.g., the augmented event noise segments and the event noise segments) with an impulse-response file such that the resulting output audio exhibits the reverberation, reflection, and decay characteristics of the corresponding physical environment.

For example, a protected audio segment corresponding to a musical song may be convolved with a stadium impulse-response file to generate a version of the song that sounds as if it were played through stadium loudspeakers. Similarly, an augmented event noise segment corresponding to crowd reactions may be convolved with the same stadium impulse-response file to generate an output that sounds as if the crowd noise occurred naturally within that environment.

It shall be noted that, once an augmented protected audio segment or augmented event noise segment has been convolved with the impulse-response file, the resulting output may be referred to as a convolved audio segment. As described in more detail below, S220 may subsequently merge or combine a plurality of convolved audio segments by temporally arranging or merging them to form a synthetic audio composite that simulates the coexistence of protected and non-protected content within a shared environment.

Generating Labeled Synthetic Audio Composites

In some embodiments, generating the plurality of synthetic audio composites may further include inserting each convolved audio segment at one or more time indices to form a respective (labeled) synthetic audio composite. Each synthetic audio composite may include one or more convolved protected audio segments and one or more convolved event noise segments that have been inserted at distinct or overlapping temporal locations (e.g., time indices) within the synthetic audio composite.

For example, in some embodiments, a first convolved protected audio segment may be inserted beginning at a first time index (e.g., 0 seconds) and extending to a second time index (e.g., 20 seconds). A second convolved protected audio segment (e.g., a different song excerpt) may be inserted beginning at a third time index (e.g., 40 seconds) and extending to a fourth time index (e.g., 60 seconds). A first convolved event noise segment (e.g., speech commentary) may then be inserted beginning at a fifth time index (e.g., 21 seconds) and extending to a sixth time index (e.g., 39 seconds), while a second convolved event noise segment (e.g., crowd reactions or ambient environmental noise) may be inserted beginning at a seventh time index (e.g., 61 seconds) and extending to an eighth time index (e.g., 80 seconds). In some embodiments, two or more convolved audio segments may partially or completely overlap in time to simulate real-world acoustic scenarios in which protected content (e.g., music) and non-protected content (e.g., speech, crowd noise, or environmental sounds) occur simultaneously or blend across temporal boundaries.

It shall be noted that the foregoing example is not intended to be limiting and that additional or different convolved protected and/or convolved event noise segments may be inserted at alternative time indices, in varying quantities, or in different sequential or overlapping arrangements without departing from the scope of the disclosure. It shall also be noted that convolving each augmented audio segment and/or noise segment with the impulse-response file in this manner may enable every segment to inherit the reverberation and spatial acoustic properties of the corresponding physical environment, thereby causing the resulting synthetic audio composite to sound as if the protected and non-protected content were recorded within that physical environment.

In some embodiments, a respective (labeled) synthetic audio composite generated by S220 may further include or be stored in association with classification metadata identifying one or more time-indexed regions corresponding to protected content within the respective synthetic audio composite (e.g., protected content classification metadata) and one or more time-indexed regions corresponding to non-protected content within the within the respective synthetic audio composite (e.g., non-protected content classification metadata). For instance, in the example described above, the classification metadata may indicate that a "protected content" label applies to the intervals between 0-20 seconds and 40-60 seconds, while a "non-protected content" label applies to the intervals between 21-39 seconds and 61-80 seconds.

In some embodiments, S220 may automatically repeat one or more of the above-described operations until S220 generates a plurality of synthetic audio composites that satisfy a training sample diversity threshold (e.g., 1,000, 2,000, 5,000, 50,000, 300,000 training data samples). The training sample diversity threshold, in some embodiments, may be satisfied when the plurality of generated synthetic audio composites collectively exhibit a sufficient range of acoustic, environmental, and content variations to ensure robust model generalization. For example, the training sample diversity threshold may be satisfied when the plurality of synthetic audio composites include a predetermined number (e.g., 50, 100, 200, 1,000, etc.) of distinct impulse-response environments (e.g., stadiums, arenas, offices, and outdoor spaces).

Additionally, or alternatively, satisfying the training sample diversity threshold may further include generating a minimum quantity of labeled synthetic audio composites. For instance, the training sample diversity threshold may be satisfied when S220 generates at least 5,000, 10,000, 50,000, 100,000, or 800,000 synthetic audio composites. The additional synthetic audio composites generated by S220 to satisfy the training sample diversity threshold may have the same or similar characteristics, or be generated in the same or similar ways as, as the respective synthetic audio composites described above. Once the training sample diversity threshold is satisfied, S220 may store the resulting plurality of (labeled) synthetic audio composites in computer memory for subsequent supervised training of one or more of the above-described machine learning models.

Training the Audio Origination Machine Learning Model

In some embodiments, S220 may use the plurality of synthetic audio composites to train the audio origination machine learning model (and/or one of the other machine learning models described above). Using the plurality of synthetic audio composites to train the audio origination machine learning model may include creating a plurality of audio origination training data samples from the plurality of synthetic audio composites.

In some embodiments, each of the plurality of audio origination training data samples may correspond to a distinct synthetic audio composite. For example, S220 may create a first audio origination training data sample based on a first respective synthetic audio composite and a second audio origination training data sample based on a second respective synthetic audio composite. Each of the plurality of audio origination training data samples may include an input feature comprising a respective synthetic audio composite.

For example, the input feature of the first audio origination training data sample may comprise a first respective synthetic audio composite, and the input feature of a second audio origination training data sample may comprise a second respective synthetic audio composite. Additionally, in some embodiments, each of the plurality of audio origination training data samples may include an audio origination source label. For instance, S220 may assign an audio origination source label to each time-indexed segment of a respective synthetic audio composite based on its simulated origination type. For example, a first audio origination source label (e.g., the label "production") may be assigned to one or more time-indexed segments that simulate production music within an environment (e.g., studio-quality audio added directly to the composite), while a second audio origination source label (e.g., the label "live") may be assigned to one or more time-indexed segments that simulate live music within an environment (e.g., music reproduced through speakers and captured via a microphone). In some embodiments, segments that do not include music may be assigned a third label or a null value indicating the absence of music. It shall be noted that one or more other audio origination training data samples may be created by S220 in analogous ways described above.

In some embodiments, after creating the plurality of audio origination training data samples as described above, S220 may input the plurality of audio origination training data samples into the audio origination machine learning model. Each audio origination training data sample may be input to the audio origination machine learning model such that the respective synthetic audio composite included in the input feature is processed through a plurality of neural network layers configured to extract spectral-temporal features and generate one or more audio origination predictions corresponding to each time-indexed segment of the synthetic audio composite.

In some embodiments, S220 may train the audio origination machine learning model to classify each input feature of the plurality of audio origination training data samples into one of the assigned audio origination source labels. For example, the audio origination machine learning model may be trained to classify each time-indexed segment of a synthetic audio composite as either production music (e.g., first audio origination source label) or live music (e.g., second audio origination source label) based on learned spectral, harmonic, and reverberation patterns.

Training the audio origination machine learning model may include optimizing one or more sets of model parameters (e.g., weights and biases) by minimizing a loss function (e.g., binary cross-entropy loss or categorical cross-entropy loss) that quantifies differences between the predicted audio origination classifications and the true labels provided in the plurality of audio origination training data samples. In some embodiments, S220 may employ a gradient-based optimization algorithm, such as stochastic gradient descent (SGD), RMSProp, or Adam, to iteratively adjust the parameters of the audio origination machine learning model until model convergence is achieved or a predefined training performance threshold is satisfied.

Additionally, or alternatively, S220 may perform validation during or after training by evaluating the trained audio origination machine learning model on a subset of held-out audio origination training data samples. The validation process may ensure that the model generalizes across diverse recording conditions simulated in the plurality of synthetic audio composites (e.g., varying impulse-response environments, background noise levels, and music types). In some embodiments, training may be repeated for multiple epochs or until validation accuracy and loss metrics stabilize within an acceptable range.

2.30 Routing the Raw Media Item to an Audio Sanitization Service Implementing a Plurality of Audio Separation Machine Learning Models S230, which includes routing a raw media item to an audio sanitization service, may function to route the raw media item to an audio sanitization (e.g., separation) service when one or more acoustic features detected for the raw media item indicate that the raw media item includes one or more protected media assets. In one example, S230 may reference or access song recognition data generated by the protected-content recognition model of S220 when determining whether the one or more acoustic features of the raw media item indicate a presence of one or more protected media assets.

For instance, if the song recognition data indicates that one or more songs are present within the raw media item, S230 may determine that the raw media item includes one or more protected media assets. In such embodiments, S230 may route the full raw media item or one or more portions (e.g., time-indexed segments) of the raw media item that correspond to the timestamp(s) identified in the song recognition data. That is, in some embodiments, the portions of the raw media item that are routed to the audio sanitization service may correspond to the specific temporal intervals where the detected protected media assets occur, as indicated by the song metadata.

Additionally, or alternatively, S230 may reference or access one or more music-presence inferences generated by the protected-content localization machine learning model of S220 when determining whether the raw media item includes one or more protected media assets. For example, if a music probability value in one or more music-presence inferences meets or exceeds a predefined music detection threshold (e.g., 0.5, 0.6, 0.7), S230 may determine that the raw media item includes one or more protected media assets. In such embodiments, S230 may route the full raw media item or only the corresponding time-indexed segments associated with the above-threshold music-presence inferences to the audio sanitization service for separation. Conversely, if the music probability values for all music-presence inferences fall below the predefined threshold, S230 may determine that the raw media item does not include one or more protected media assets and may bypass (e.g., forgo) routing of the raw media item to the audio sanitization service.

Additionally, or alternatively, S230 may reference or access one or more audio origination inferences generated by the audio origination machine learning model of S220 when determining whether the raw media item includes one or more protected media assets. Each audio origination inference, as described above, may indicate an audio origination source (e.g., a classification label) for a respective time-indexed segment of the raw media item, such as live music or production music. If one or more audio origination inferences classify a corresponding time-indexed segment of the raw media item as live music or production music, S230 may determine that the raw media item includes one or more protected media assets. In such embodiments, S230 may route the full raw media item or one or more portions (e.g., time-indexed segments) of the raw media item associated with those live-music or production-music classifications to the audio sanitization service for separation. Conversely, if all time-indexed segments of the raw media item are classified as non-music or no audio origination inference indicates live or production music, S230 may determine that the raw media item does not include one or more protected media assets and may bypass routing to the audio sanitization service.

In some embodiments, S230 may determine whether to route the raw media item to the audio sanitization service based on a model-consensus threshold (e.g., that is defined by a subscriber). The model-consensus threshold may define a number or combination of the above-described models (e.g., the protected-content recognition model, the protected-content localization machine learning model, and/or the audio origination machine learning model) that must each detect or infer a presence of protected media assets before routing occurs. For example, S230 may determine that routing is required when at least one, two, or all three of the models indicate that the raw media item includes one or more protected media assets. In some embodiments, if the number of models generating a positive detection for protected content satisfies or exceeds the model-consensus threshold, S230 may initiate routing of the full raw media item or the corresponding portions (e.g., time-indexed segments) of the raw media item to the audio sanitization service for separation. Conversely, if fewer than the required number of models detect or infer protected content, S230 may determine that the raw media item does not qualify for sanitization and may bypass routing of the raw media item to the audio sanitization service.

Alternatively, in some embodiments, every raw media item received by the method 200 may be processed by the audio sanitization service, regardless of whether any protected media assets are initially detected. Thus, in some embodiments, method 200 may not perform the routing determination of S230 and may instead proceed directly to S240. In such embodiments, the audio sanitization service may automatically execute one or more audio separation machine learning models on all uploaded or ingested raw media items by default.

2.40 Separating Protected Media Assets from Non-Protected Portions of a Raw Media Item S240, which includes separating protected media assets from non-protected portions of a raw media item, may function to execute one or more audio separation machine learnings to separate or remove the protected media asset(s) from the non-protected portion(s) of the raw media item (as generally illustrated in the bottom portion of FIG. 5). An audio separation machine learning model, as generally used herein, may refer to a trained machine learning model (e.g., neural network) configured to receive the raw media item (or portions of the raw media item) as input and generate, as output, one or more separated audio tracks or waveforms that isolate different types of sounds contained in the raw media item.

For example, in response to receiving a raw media item as input, the audio separation machine learning model may generate a first audio track (e.g., first separated waveform) that only includes protected content (e.g., copyrighted or licensed music) and a second audio track (e.g., second separated waveform) that only includes non-protected content (e.g., speech, crowd noise, or ambient sounds). It shall be noted that, each separated audio track may remain synchronized with the inputted raw media item so that the separated content can later be reconstructed or replaced without affecting timing or playback.

In some embodiments, as illustrated in FIG. 3, the one or more audio separation machine learning models of S240 may be implemented at an audio sanitization service. An audio sanitization service, as generally used herein, may refer to a sub-system or a microservice of a remote media sanitization service (e.g., system 100). The audio sanitization service may execute the one or more audio separation machine learning models via one or more computing nodes or threads. In particular, each computing node or thread may execute a distinct audio separation machine learning model to enable parallelized or distributed separation of the raw media item (or portions thereof). It shall be noted that, in some embodiments, the audio recognition service of S220 may execute its respective models in a similar parallelized or distributed configuration.

In some embodiments, in response to S230 routing a raw media item to the audio sanitization service, S240 may input the raw media item (or one or more time-indexed segments thereof) to one or more audio separation machine learning models. The one or more audio separation machine learning models may at least include a first audio separation machine learning model and a second audio separation machine learning model. The first audio separation machine learning model and the second audio separation machine learning model may each comprise a distinct set of (e.g., trained) separation and reconstruction weight and bias parameters that govern how each audio separation model isolates, suppresses, and reconstructs different acoustic (e.g., spectral) components within the raw media item. Thus, each of the first and second audio separation machine learning models may process the same input data, but generate separation outputs that vary in fidelity, spectral suppression accuracy, and/or speech preservation quality.

For instance, in response to receiving the raw media item, the first audio separation machine learning model may generate one or more reconstructed audio tracks of the raw media item using the distinct set of separation and reconstruction weight and bias parameters associated with the first audio separation machine learning. The one or more reconstructed audio tracks may include a first reconstructed audio track comprising non-protected audio data within the raw media item (e.g., speech, crowd noise, or ambient sounds) and a second reconstructed audio track comprising protected audio data (e.g., copyrighted or licensed music). Stated another way, the first reconstructed audio track may suppress or remove spectral components in the raw media item associated with the protected audio data in the raw media item.

Similarly, in response to the second audio separation machine learning model receiving the same raw media item, the second audio separation machine learning model may generate one or more reconstructed audio tracks of the raw media item using its respective distinct set of separation and reconstruction weight and bias parameters. The one or more reconstructed audio tracks may include a third reconstructed audio track comprising non-protected audio data within the raw media item (e.g., speech, crowd noise, or ambient sounds) and a fourth reconstructed audio track comprising protected audio data (e.g., copyrighted or licensed music). Stated another way, the third reconstructed audio track may suppress or remove spectral components in the raw media item associated with the protected audio data in the raw media item.

It shall be noted that the above example is not intended to be limiting and that the one or more audio separation machine learning models of S240 may include additional, different, or fewer models without departing from the scope of the disclosure.

Moreover, after the one or more reconstructed audio tracks have been generated by the audio separation machine learning models, S240 may merge one or more of the reconstructed audio tracks with the video data of the raw media item to generate a plurality of sanitized instances of the raw media item. For example, S240 may merge the above-described first reconstructed audio track (e.g., the audio track comprising the non-protected audio data) with the video data of the raw media item to generate a first sanitized instance. Similarly, S240 may merge the above-described third reconstructed audio track (e.g., the audio track comprising the non-protected audio data reconstructed with higher fidelity) with the video data of the raw media item to generate a second sanitized instance. Each of the sanitized instances of the raw media item may include video data synchronized with a respective reconstructed audio track that excludes or suppresses the protected audio data while retaining non-protected content, such as speech, crowd noise, or environmental sounds. It shall be noted that S240 may generate additional, different, or fewer sanitized instances without departing from the scope of the disclosure.

Architecture of the Audio Separation Machine Learning Models

In some embodiments, each audio separation machine learning model implemented by the audio sanitization service may include a neural network configured to perform audio separation through learned feature extraction, masking, and waveform reconstruction. Each audio separation machine learning model may generally include an encoder-decoder structure with skip connections that enable the audio separation machine learning model to retain both low-level temporal details and high-level spectral context during the audio separation process. The encoder portion of the neural network may include multiple convolutional layers configured to progressively downsample an input spectrogram representation (e.g., time-frequency data) of the raw media item, thereby compressing the time-frequency information into a compact latent representation while expanding the feature depth. The decoder portion of the neural network may include a corresponding series of upsampling convolutional layers that reconstruct separated source estimates (e.g., music versus speech) from the latent representation, with skip connections between corresponding encoder and decoder layers to enhance reconstruction accuracy. Each convolutional layer may be followed by a normalization function (e.g., batch normalization or group normalization) and an activation function (e.g., ReLU or Leaky ReLU) to improve model stability and convergence.

In some embodiments, the neural network of an audio separation machine learning model may further include a feature compression and attention layer configured to refine the latent representation by emphasizing spectral cues associated with target audio sources (e.g., vocals, instruments, ambient noise, or crowd sounds). For example, the feature compression stage may project high-dimensional time-frequency features into a lower-dimensional latent space to improve separation efficiency, while an attention mechanism selectively enhances frequency components most relevant to the target source. A subsequent reconstruction stage may include transposed convolutional layers and residual connections configured to reconstruct waveform-level outputs with reduced distortion, artifact suppression, and improved phase coherence. The audio separation machine learning models may be trained using a combination of loss functions, such as spectral magnitude loss, time-domain waveform loss, and phase consistency loss, to optimize separation fidelity.

In some embodiments, the plurality of audio separation machine learning models may differ from one another in architectural configuration, layer composition, and depth. For example, one audio separation machine learning model may include a relatively shallow encoder-decoder structure optimized for real-time processing with fewer convolutional and upsampling layers, while another audio separation machine learning model may include a deeper network with additional residual or attention blocks configured to improve spectral separation fidelity and speech preservation. Similarly, one audio separation machine learning model may employ larger receptive fields to capture long-term temporal dependencies in the raw media item, whereas another may use smaller kernel sizes to emphasize fine-grained frequency resolution. The distinct architectural parameters, including the number of layers, kernel dimensions, normalization schemes, and activation functions, may collectively enable each audio separation machine learning model to specialize in different aspects of separation quality, such as clarity of speech reconstruction, suppression of residual music, or reduction of background artifacts. It shall be noted that additional, different, or fewer architectural variations may be employed without departing from the scope of the disclosure.

It shall be noted that the above-example(s) are not intended to be limiting and that other embodiments of the audio separation machine learning models may implement bidirectional stacked recurrent neural networks (BSRNN) or transformer-based separation architectures (e.g., BS-Ro-Former) without departing from the scope of the disclosure. Additionally, in some embodiments, one or more of the audio separation machine learning models may operate on time-frequency data representations (e.g., spectrograms, Mel-spectrograms, or complex short-time Fourier transform data), while other embodiments may operate directly on time-domain representations (e.g., raw waveform data).

Training the Audio Separation Machine Learning Models

In some embodiments, S240 may use the plurality of synthetic audio composites generated in S220 to train the plurality of audio separation machine learning models. Using a plurality of synthetic audio composites to train the plurality of audio separation machine learning models may include creating a plurality of audio separation training data samples from the plurality of synthetic audio composites.

In some embodiments, each of the plurality of audio separation training data samples may correspond to a respective synthetic audio composite of the plurality of synthetic audio composites. For example, S240 may create a first audio separation training data sample based on a first respective synthetic audio composite and a second audio separation training data sample based on a second respective synthetic audio composite. Each of the plurality of audio separation training data samples may include an input feature and a target output feature.

In some embodiments, the input feature of each audio separation training data sample may be the corresponding synthetic audio composite. The synthetic audio composite file may include one or more augmented protected audio segments (e.g., licensed or copyrighted music) and one or more augmented event noise segments (e.g., speech, crowd noise, or ambient sounds) inserted at respective locations, as described above. The target output feature of each audio separation training data sample may include a first separated waveform comprising the one or more augmented protected audio segments and a second separated waveform comprising the one or more augmented event noise segments.

For example, in some embodiments, the input feature of a first audio separation training data sample may include a first synthetic audio composite that simulates a stadium environment containing both crowd noise and a copyrighted song played through loudspeakers. The target output feature associated with this training data sample may include a first separated waveform containing only the copyrighted song and a second separated waveform containing only the crowd noise. In another example, the input feature of a second audio separation training data sample may include a respective synthetic audio composite that simulates an interview captured with background music and ambient chatter. The target output feature associated with this training data sample may include a first separated waveform containing only the background music and a second separated waveform containing the interview dialogue and ambient chatter. Other audio separation training data samples may be created by S240 in analogous ways based on additional synthetic audio composites.

In some embodiments, after creating the plurality of audio separation training data samples, S240 may input the plurality of audio separation training data samples to the plurality of audio separation machine learning models. Each input feature may be processed by the plurality of audio separation machine learning models to produce predicted separated waveforms corresponding to the target output features described above. During training, the plurality of audio separation machine learning models may be optimized to accurately separate the input features into their respective protected-content and non-protected-content waveforms.

In some embodiments, training the plurality of audio separation machine learning models may include minimizing a separation loss function that quantifies a difference between the predicted separated waveforms and the target output features. The separation loss function may include one or more loss components, such as a waveform reconstruction loss, spectral magnitude loss, and/or signal-to-distortion ratio (SDR) loss. In some embodiments, S240 may employ a gradient-based optimization algorithm (e.g., stochastic gradient descent (SGD), RMSProp, or Adam) to iteratively adjust model parameters (e.g., weights and biases) until convergence or until a predefined training performance threshold is satisfied.

Additionally, or alternatively, S240 may perform validation during or after training by evaluating each trained audio separation machine learning model on a held-out subset of synthetic audio composites not used for training. The validation process may assess generalization performance across diverse simulated recording conditions, including different impulse-response environments, background noise levels, and overlap ratios between protected and non-protected content. In some embodiments, the training process may be repeated for multiple epochs or until validation metrics such as SIR (signal-to-interference ratio), or SAR (signal-to-artifact ratio) stabilize within acceptable thresholds.

It shall be noted that the above-described training process is not intended to be limiting. In some embodiments, the plurality of audio separation machine learning models may be retrained or fine-tuned using new synthetic or real-world data, or via alternative training techniques (e.g., semi-supervised, unsupervised, or transfer learning) without departing from the scope of the disclosure.

Verifying Separated Outputs Using the Models of S220

As also illustrated in FIG. 3, after the audio separation machine learning models of S240 generate one or more reconstructed (e.g., separated) audio tracks that are designated as containing non-protected audio data, the audio sanitization service may verify that those reconstructed audio tracks no longer include any protected media assets. To perform such verification, S240 may input one or more of the reconstructed audio tracks designated as containing only non-protected audio data to one or more of the machine learning models executed by S220 to determine whether any residual protected content remains detectable within the reconstructed audio tracks.

In some embodiments, inputting one or more of the reconstructed audio tracks to the one or more models of S220 may include, but should not be limited to, inputting the first reconstructed audio track (described above) and the third reconstructed audio track (also described above) into the protected-content recognition model, the protected-content localization machine learning model, and/or the audio origination machine learning model. Each of the models may then process the first and the third reconstructed audio tracks to determine whether any residual indicators of protected content remain.

For example, the protected-content recognition model may assess the first and third reconstructed audio tracks to determine whether any songs remain identifiable within such inputted audio tracks. If the protected-content recognition model returns no song detections or only low-confidence matches (e.g., confidence scores below a predefined threshold of 0.5, 0.6, or 0.7), S240 may determine that those reconstructed audio tracks are free of identifiable protected music. Conversely, if the protected-content recognition model identifies a song match, such as a residual portion of a licensed track still detectable within a respective reconstructed audio track, S240 may flag that reconstructed audio track for further review or annotation as potentially containing protected material and/or route that reconstructed audio track to a review queue for review by a subscriber.

Additionally, the protected-content localization machine learning model may generate music-presence inferences for each time-indexed segment of the first and third reconstructed audio tracks. If all music-presence inferences for the reconstructed tracks yield music probability values below a music-presence threshold, S240 may determine that no music segments remain in such reconstructed audio tracks. However, if a subset of time-indexed segments within a respective reconstructed track yields above-threshold values (e.g., 0.8 or 0.9), S240 may designate those specific segments as possibly containing residual protected material and flag them for additional review by a subscriber (e.g., route that reconstructed audio track to a review queue for review by a subscriber).

Further, the audio origination machine learning model may classify the origination source of detected audio in each reconstructed audio track. For instance, if all time-indexed segments of the first and third reconstructed audio tracks are classified as non-music or ambient audio, S240 may verify successful removal of protected content. Conversely, if one or more time-indexed segments are classified as live or production music, S240 may annotate those segments as potential residual content that requires review prior to publication or distribution and/or may route the associated reconstructed audio track to a review queue for review by a subscriber.

2.50 Returning Sanitized Instances of the Raw Media Item in Response to Subscriber-Initiated Request S250, which includes returning sanitized instances of a raw media item, may function to return one or more sanitized instances of a raw media item in response to receiving a subscriber-initiated request to remove protected content from the raw media item. In some embodiments, returning one or more sanitized instances of a raw media item may include generating and displaying a graphical user interface to a subscriber of the remote media sanitization service (e.g., system 100). Additionally, or alternatively, returning the sanitized instances of the raw media item may include transmitting one or more sanitized instances of the raw media, optionally along with one or more of the below-described elements, to a third-party platform or application via an application programming interface (API).

Generating a Protected-Content Segmentation Map

Figure 4B:
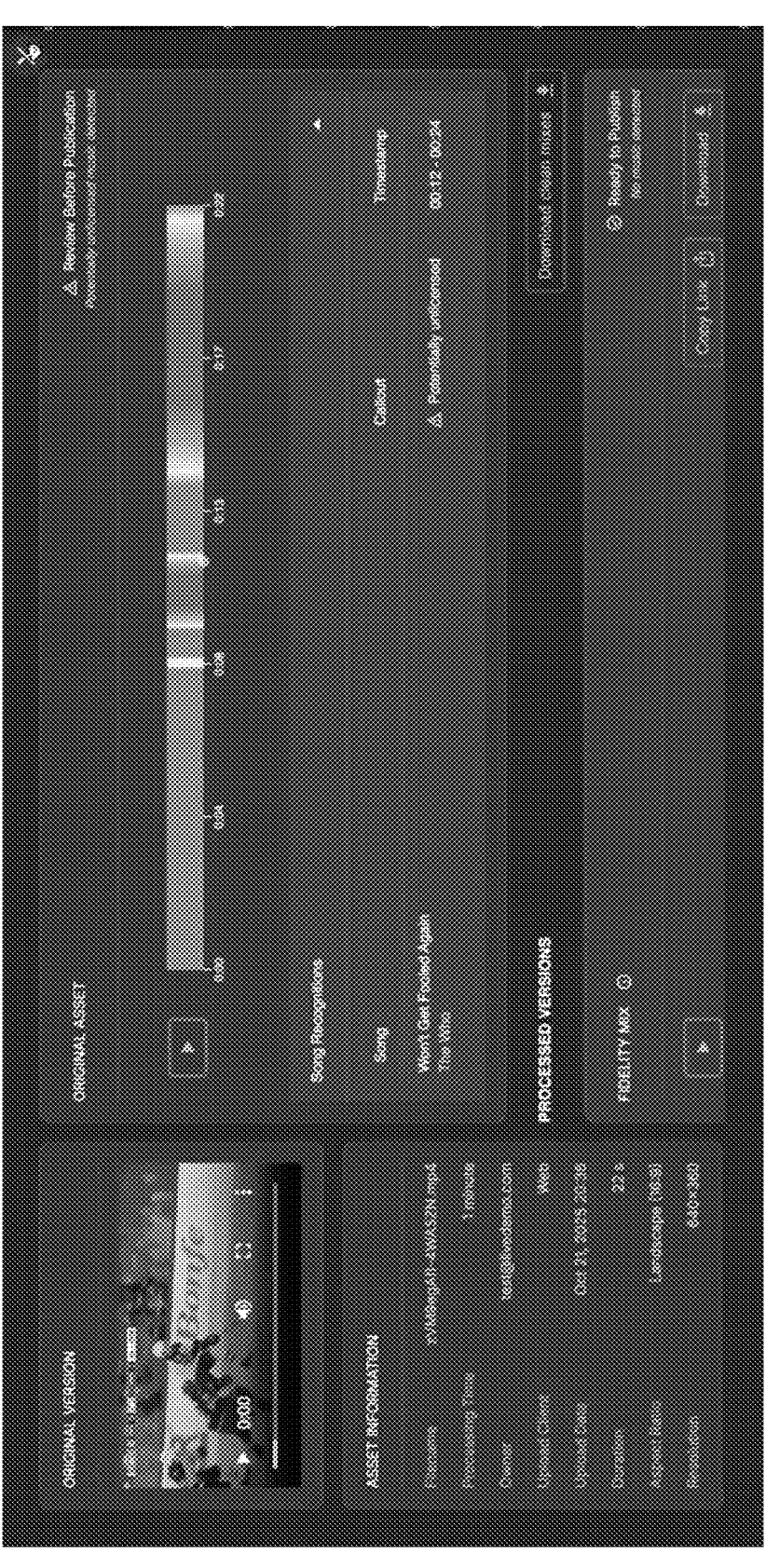

In some embodiments, as illustrated in FIG. 4B, generating the graphical user interface may include generating a protected-content segmentation map. A protected-content segmentation map, as generally used herein, may refer to a visual user interface element (e.g., interactive heat map, timeline bar, etc.) that provides a temporal visualization of where protected media assets occur within the raw media item. The protected-content segmentation map may extend horizontally across a playback timeline from a start time to an end time of the raw media item and may be divided into a plurality of gradient-encoded segments. Each gradient-encoded segment may correspond to a distinct time interval (e.g., one millisecond, one second, etc.) and may be assigned a gradient intensity or color value representing a likelihood that the corresponding time interval includes a presence of one or more protected media assets. Collectively, the protected-content segmentation map may provide a continuous, color-graded representation of predicted (protected) content across the full duration of the raw media item.

In some embodiments, S250 may assign a respective gradient intensity or color value to a respective gradient-encoded segment based on temporal detections and inferences generated by one or more of the models in S220. For instance, S250 may reference or access the song recognition data generated by the protected-content recognition model to detect one or more time intervals of the raw media item in which one or more songs are detected. Additionally, S250 may reference or access one or more music-presence inferences generated by the protected-content localization machine learning model to detect time-indexed segments of the raw media item that are associated with music. Furthermore, S250 may reference or access one or more audio origination inferences generated by the audio origination machine learning model to detect time-indexed segments of the raw media item that are classified as live music or production music.

Using the temporal detections and inferences obtained from the models of S220, S250 may determine (e.g., detect) remaining time intervals of the raw media item that do not overlap with the one or more time intervals identified by the protected-content recognition model as containing music (e.g., a song). Additionally, in some embodiments, the detected remaining time intervals may not overlap with any time-indexed segments detected by the protected-content localization machine learning model as containing music or any time-indexed segments classified by the audio origination machine learning model as live or production music. Thus, the remaining time intervals may therefore correspond to regions of the raw media item that are likely free of protected content, and S250 may assign a predefined low gradient intensity or color value (e.g., green) to the corresponding gradient-encoded segments of the protected-content segmentation map to visually indicate such regions.

Conversely, in some embodiments, S250 may use the temporal detections and inferences obtained from the models of S220 to determine (e.g., detect) one or more overlapping time intervals (e.g., time-indexed segments) of the raw media item that are commonly identified by multiple models as containing music-related content. For example, S250 may detect a common set of time-indexed segments across the one or more time-indexed segments detected by the protected-content localization machine learning model and the one or more second time-indexed segments detected by the audio origination machine learning model. Such overlapping or common time-indexed segments may correspond to regions of the raw media item where both models independently indicate a presence of protected content (e.g., high music-presence inference and live or production music classification). Accordingly, S250 may assign a predefined high gradient intensity or color value (e.g., red) to the subset of gradient-encoded segments corresponding to the common set of time-indexed segments to visually indicate regions of the raw media item that have a high likelihood of containing protected content.

In some embodiments, S250 may additionally detect one or more intermediate time intervals of the raw media item that are identified by only one of the models in S220 as containing potential music-related content. For example, such intervals may include time-indexed segments that are classified by the audio origination machine learning model as live or production music but are not concurrently detected by the protected-content localization machine learning model as containing music (e.g., time-indexed segments that form a superset of the music-presence detections identified by the protected-content localization machine learning model. Such intermediate time intervals may therefore correspond to regions of the raw media item where the presence of protected content is uncertain or only partially supported by model inferences. Accordingly, S250 may assign a predefined intermediate gradient intensity or color value (e.g., yellow) to the corresponding gradient-encoded segments of the protected-content segmentation map to visually indicate such regions as requiring further review or verification by a subscriber.

Figure 4C:
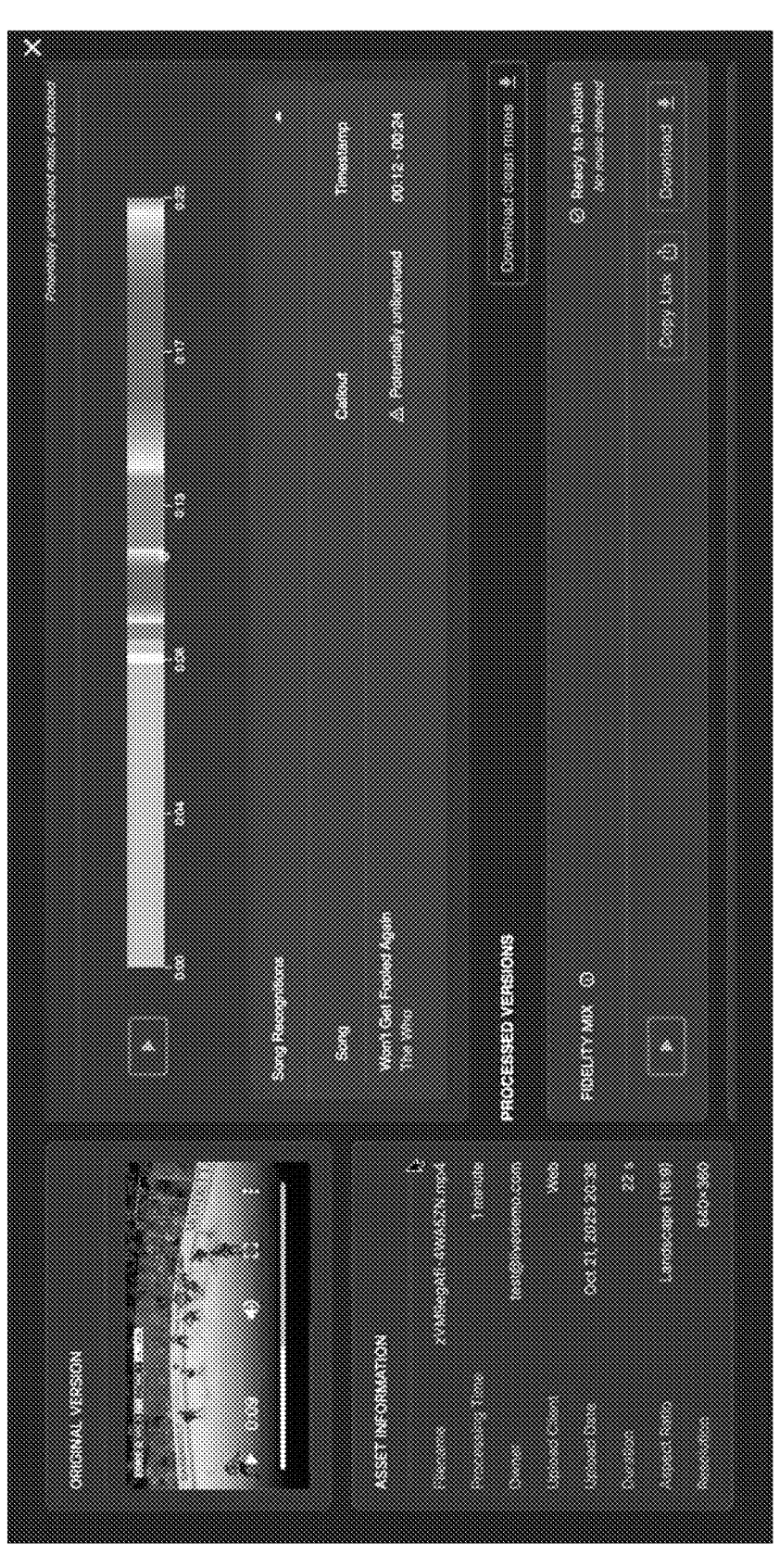
Figure 4D:
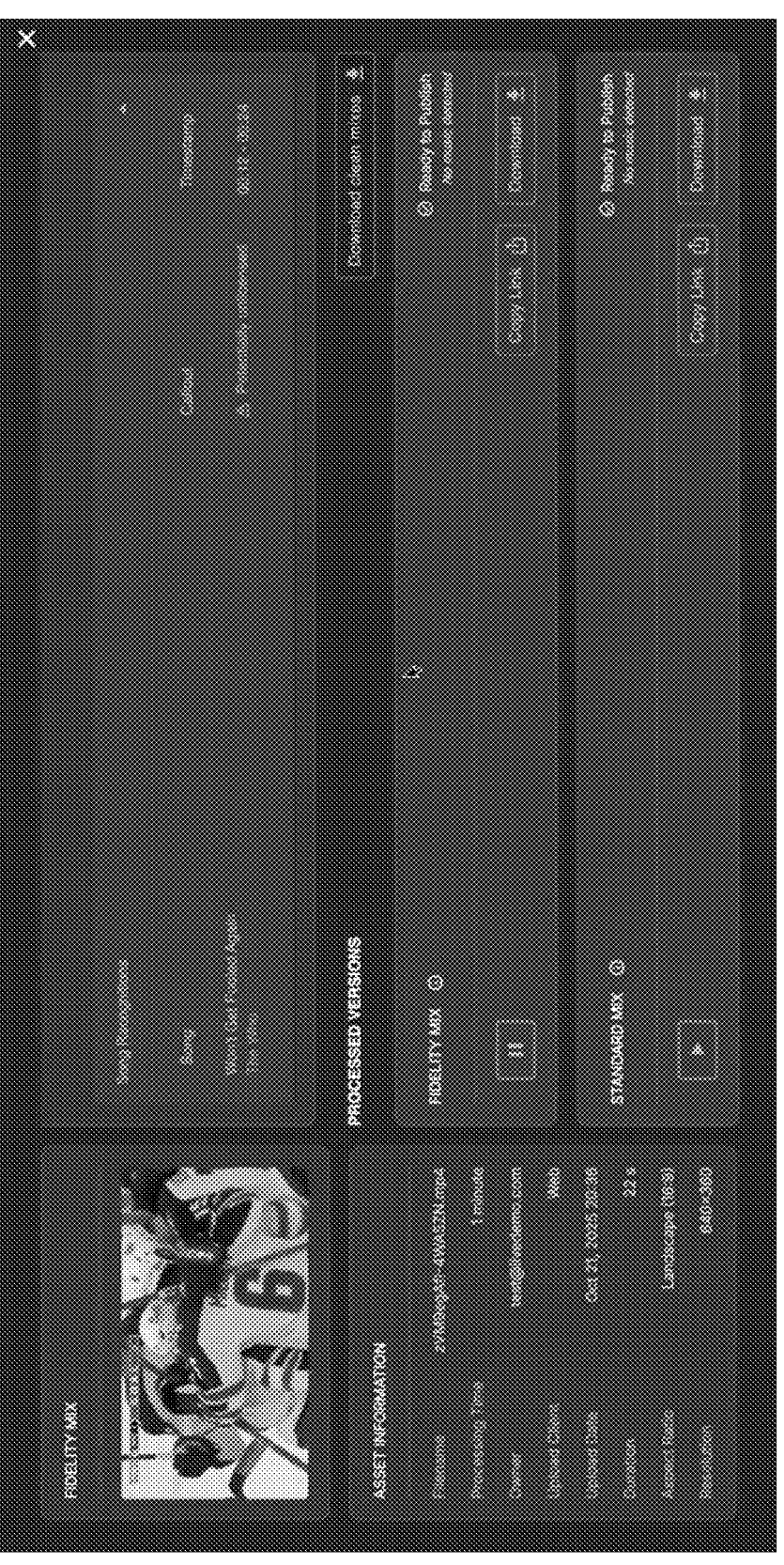
Figure 4E:
Figure 4F:
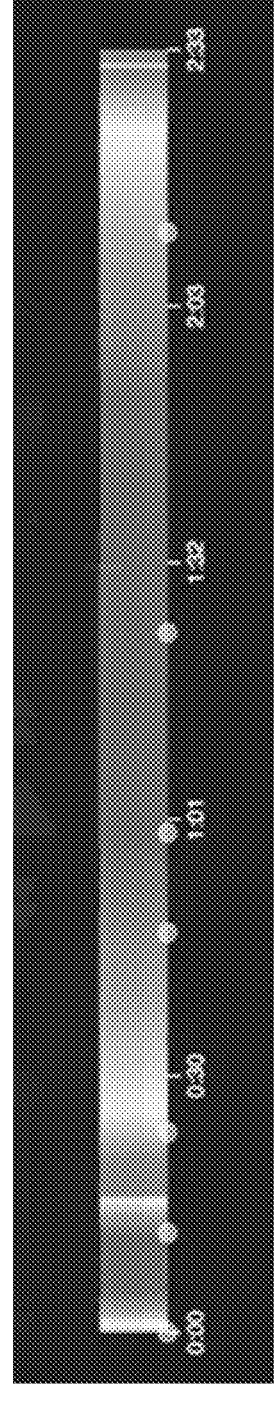

In some embodiments, as illustrated in FIGS. 4B and 4F, S250 may additionally generate and superimpose one or more protected-content markers on the protected-content segmentation map (e.g., 1, 2, 3, 8, 10, 20, etc. protected-content markers). For example, based on the song recognition data generated by the protected-content recognition model, S250 may detect that a first respective protected media asset (e.g., a first song) begins at a first time within the raw media item. In response to detecting that the first respective protected media asset begins at the first time within the raw media item, S250 may detect a first gradient encoded segment in the protected-content segmentation map that corresponds to the first time and, in turn, superimpose a first protected-content marker (e.g., a circular icon, vertical line, flag, etc.) on that gradient encoded segment to visually indicate the temporal position of the first respective protected media asset within the raw media item.

It shall be noted that the above example is not intended to be limiting, and that the protected-content segmentation map may include additional, different, or fewer protected-content markers without departing from the scope of the disclosure. For instance, in some embodiments, S250 may further detect that a second protected media asset (e.g., a second song or licensed audio clip) begins at a second time within the raw media item. In such embodiments, S250 may determine that the second time corresponds to a second gradient-encoded segment of the protected-content segmentation map and, in turn, may superimpose a second protected-content marker on that gradient-encoded segment to visually indicate the second protected media asset. The protected-content markers, in some embodiments, may align with corresponding gradient color regions (e.g., high-intensity red segments) to help a subscriber visually identify the moments in the raw media item where protected media assets occur.

In some embodiments, S250 may receive a user input selecting one or more of the protected-content markers in the protected-content segmentation map (as generally illustrated in FIG. 4E). For example, S250 may receive a first user input selecting the first protected-content maker. In response to receiving the first user input, S250 may display, within the graphical user interface, a first protected-content tooltip associated with the first protected-content marker. The first protected-content tooltip may include text or metadata indicating a name of the first protected media asset (e.g., a song title or clip name), an artist or rights holder associated with the protected media asset, and a timestamp indicating that the first protected media asset begins at the first time within the raw media item.

Similarly, S250 may receive a second user input selecting the second protected-content marker displayed within the protected-content segmentation map. In response to receiving the second user input, S250 may display, within the graphical user interface, a second protected-content tooltip associated with the second protected-content marker. The second protected-content tooltip may include text or metadata indicating a name of the second protected media asset (e.g., a different song title or clip name), an artist or rights holder associated with the second protected media asset, and a timestamp indicating that the second protected media asset begins at the second time within the raw media item. In some embodiments, the tooltips may appear adjacent to their respective markers or within a dedicated overlay panel to allow the subscriber to easily review details about multiple protected media assets detected within the raw media item.

Media Playback Element

In some embodiments, as illustrated in FIG. 4B, the graphical user interface may include a media playback element. The media playback element may be configured to present audio-visual playback of the raw media item or one or more sanitized instances of the raw media item. The media playback element may include a playback timeline, progress indicator, and audio output controls that enable a subscriber to listen to or view selected portions of the raw media item in real time. In some embodiments, the media playback element may be synchronized with the protected-content segmentation map such that playback progress within the media playback element corresponds directly to the horizontal progression of gradient-encoded segments within the map. Such synchronization may allow a subscriber to visually and audibly correlate the occurrence of protected and non-protected content while reviewing the raw media item.

As the media playback element plays the raw media item, S250 may continuously update a playback progress indicator of the protected-content segmentation map in real time (as generally illustrated in FIG. 4C). The playback progress indicator may move horizontally along the protected-content segmentation map in synchronization with the current playback position of the raw media item in the media playback element. As the playback progress indicator advances, S250 may dynamically change the opacity or visual brightness of one or more gradient-encoded segments that correspond to previously played time intervals. For example, gradient-encoded segments that the playback progress indicator has already passed may fade to a lighter or more transparent shade to visually indicate that the current playback position has progressed beyond those segments. Conversely, upcoming gradient-encoded segments may retain full color saturation or intensity, thus helping the subscriber quickly distinguish between reviewed and unreviewed portions of the raw media item.

Play-Pause Control Element

In some embodiments, as illustrated in FIG. 4B, the graphical user interface may further include or display a play-pause control element in association with the protected-content segmentation map (e.g., centered and between the protected-content segmentation map and the media playback element). The play-pause control element may enable a subscriber to control playback of the raw media item independently of the native controls of the media playback element. Additionally, or alternatively, the play-pause control element may be displayed adjacent to the protected-content segmentation map and may serve as a unified playback interface for navigating the raw media item directly from the segmentation map.

For example, S250 may receive a first user input selecting a respective gradient-encoded segment of the protected-content segmentation map. In response to receiving the first user input, S250 may change a playback position of the media playback element to correspond to the distinct time associated with the selected gradient-encoded segment. After changing the playback position and, optionally, selecting the play-pause control element, S250 may automatically play the raw media item in the media playback element beginning from that playback position.

After receiving the first user input selecting the respective gradient-encoded segment, S250 may subsequently receive a second user input selecting the play-pause control element while the media playback element is actively playing the raw media item. In response to receiving the second user input, S250 may pause playback of the raw media item at the current playback position. The media playback element and the protected-content segmentation map may remain synchronized such that the playback progress indicator remains fixed at the corresponding gradient-encoded segment representing the paused time interval.

Content Readiness Indicator for the Raw Media Item

In some embodiments, as illustrated in FIG. 4B, the graphical user interface may further include a content readiness indicator configured to visually indicate a publication readiness of the raw media item. The content readiness indicator may display a message based on whether the protected-content segmentation map indicates a presence of one or more protected media assets within the raw media item.

For example, if the protected-content segmentation map includes one or more high-gradient (e.g., red) encoded segments corresponding to detected or potential protected media assets, S250 may display a warning message such as "Review Before Publication. Potentially unlicensed music detected." Such a message may instruct the user to review the identified regions before approving or publishing the raw media item.

Conversely, if the protected-content segmentation map indicates that no protected content has been detected (e.g., all gradient-encoded segments are assigned a low intensity value such as green), S250 may display a confirmation message such as "Ready to Publish. No protected content detected." Such a message may provide a clear cue to the subscriber that the raw media item is safe to publish.

Protected-asset Table

In some embodiments, as illustrated in FIG. 4B, the graphical user interface may further include a protected-asset table (e.g., song recognition table) generated from the song recognition data produced by the protected-content recognition model of S220. Each row of the protected-asset table may correspond to a distinct detected song within the raw media item and may include the song metadata from the song recognition data for that particular song. For example, the song metadata included in a given row may specify a song name, an artist or band name, one or more timestamps indicating where the song occurs within the raw media item, a licensing status indicator (e.g., "Licensed," "Unlicensed," or "Potentially Unlicensed"), and/or a recognition confidence score.

Attributes of the Raw Media Item

In some embodiments, as illustrated in FIG. 4B, the graphical user interface may further include one or more attributes/properties of the raw media item. The one or more attributes may provide descriptive and identifying information associated with the raw media item that has been processed by the remote media sanitization service.

For example, the one or more attributes may include a filename associated with the raw media item, a total processing time required to generate the plurality of sanitized instances, an owner or subscriber identifier (e.g., an email address or account name) associated with the raw media item, an upload client type (e.g., "Web," "Mobile," or "API"), an upload date and time associated with the raw media item, and a total duration of the raw media item. Additionally, in some embodiments, the one or more attributes may include playback and display-related properties such as an aspect ratio (e.g., "Landscape (16:9)") and a resolution (e.g., "1920×1080" or "640×360").

Sanitized-Version Cards

In some embodiments, as illustrated in FIG. 4D, the graphical user interface may further include one or more sanitized-version cards corresponding to the sanitized instances of the raw media item generated by S240. Each sanitized-version card may correspond to a distinct sanitized of the raw media item. For instance, in some embodiments, the "Standard Mix" sanitized-version card may correspond to a sanitized instance generated by a first audio separation machine learning model (e.g., optimized for audio separation performance), while the "Fidelity Mix" sanitized-version card may correspond to a sanitized instance generated by a second audio separation machine learning model (e.g., optimized for enhanced speech clarity or higher-fidelity audio separation).

In some embodiments, each sanitized-version card may include a set of user interface elements that allow a subscriber to review, export, and share the corresponding sanitized instance. For example, each sanitized-version card may include a play-pause control element that, when selected, causes the media playback element to switch playback of the media playback element to the corresponding sanitized instance. If the media playback element is currently playing the raw media item or another sanitized instance, playback may automatically transition to the selected sanitized instance and continue from the beginning or from a designated playback position. Each sanitized-version card may also include a download selectable object that, when selected, causes the sanitized instance to be downloaded to a subscriber device, and a copy link selectable object that, when selected, copies a shareable network link associated with the sanitized instance to the clipboard of the subscriber device.

In some embodiments, each sanitized-version card may further include a publication readiness indicator generated based on the verification results described above (e.g., verification using the models of S220). The publication readiness indicator may visually communicate whether the corresponding sanitized instance is verified as free of protected content and ready for publication (e.g., "Ready to Publish. No music detected") or if the verification process identified residual protected content that requires review (e.g., "Review Recommended. Potential music detected").

Additionally, the graphical user interface may include a global control element, such as a "Download Clean Mixes" selectable object, that allows the subscriber to download all sanitized instances simultaneously. Collectively, the sanitized-version cards may provide an organized, interactive interface for evaluating, verifying, and distributing the sanitized versions of the raw media item generated by the remote media sanitization service.

It shall be noted that, in some embodiments, the graphical user interface may organize the above-described user interface elements into a set of distinct user interface containers (e.g., defined regions or panels that group user interface elements together). As illustrated in FIG. 4E, the protected-content segmentation map, play-pause control element, content readiness indicator, and protected-asset table may be displayed in a first container. The media playback element may be displayed in a second container (e.g., left of the first container). The attributes of the raw media item may be displayed in a third container (e.g., below the second container). The sanitized-version cards, along with a global download selectable object, may be displayed in a fourth container (e.g., below the first container).

In some embodiments, after downloading one or more sanitized instances of the raw media item, a subscriber may perform a physical deployment or real-world distribution action using the sanitized instances. For example, the subscriber may upload the sanitized instances to a digital signage controller or public-address system installed at a physical venue to enable playback of the media without risk of broadcasting protected content. In another embodiment, the subscriber may transfer the sanitized instances onto a removable storage medium (e.g., an SD card, USB drive, or broadcast cartridge) and physically insert the medium into a camera, mixer, or playback device that will be used in a live event, retail store, or broadcast environment. Additionally, the subscriber may use the sanitized instances to replace or overwrite previously stored raw versions on local recording devices to ensure that no protected material remains accessible.

Additionally, or alternatively, the sanitized instances may be transmitted from the subscriber device to a venue-wide playback controller, an in-vehicle infotainment system, or a digital signage array to replace previously queued raw media that contained protected content. In some implementations, deployment of the sanitized instances may cause physical output devices—such as speakers, display panels, or broadcast encoders—to be reconfigured in real time to output only the sanitized audio or video tracks. Such coordinated update of tangible playback infrastructure ensures that protected content is not publicly broadcast and that the sanitization process achieves a real-world transformation in how the media is reproduced or distributed.

3. Computer-Implemented Method and Computer Program Product

Embodiments of the system and/or method can include every combination and permutation of the various system components and the various method processes, wherein one or more instances of the method and/or processes described herein can be performed in real time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein in real-time or near real-time, asynchronously (e.g., sequentially), concurrently (e.g., in parallel), or in any other suitable order by and/or using one or more instances of the systems, elements, and/or entities described herein. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for automatically removing protected content from a raw media item, the computer-implemented method comprising:

at a remote media sanitization service being implemented by a distributed network of computers:

receiving, via the distributed network of computers, a subscriber-initiated request to remove protected content from a raw media item;

in response to receiving the subscriber-initiated request:

automatically routing, by the distributed network of computers, the raw media item to an audio recognition service of the remote media sanitization service that comprises one or more trained protected content recognition models;

generating, by the audio recognition service executing the one or more trained protected content recognition models, one or more audio origination labels that indicate an origination source for the protected content associated with one or more temporal segments of the raw media item;

automatically routing, by the distributed network of computers, the raw media item to an audio sanitization service of the remote media sanitization service that comprises a plurality of trained audio separation machine learning models;

generating, by the audio sanitization service executing the plurality of trained audio separation machine learning models, a plurality of sanitized instances of the raw media item that separate the protected content from non-protected portions of the raw media item; and returning a response to the subscriber-initiated request that uses the one or more audio origination labels and the plurality of sanitized instances of the raw media item to prevent unauthorized electronic distribution of the protected content, wherein returning the response to the subscriber-initiated request includes:

generating, based on executing the one or more trained protected content recognition models, a protected-content segmentation map comprising a plurality of gradient-encoded segments extending from a start to an end of the raw media item, wherein each gradient-encoded segment of the plurality of gradient-encoded segments:

corresponds to a distinct time between the start and the end of the raw media item, and is assigned a gradient intensity value based on a likelihood that the distinct time within the raw media item includes a presence of one or more protected media assets; and displaying a graphical user interface that includes the plurality of sanitized instances of the raw media item and the protected-content segmentation map of the raw media item.

2. The computer-implemented method according to claim 1, wherein:

the one or more trained protected content recognition models and the plurality of trained audio separation machine learning models are trained using a plurality of synthetic audio composites that simulate real-world combinations of the protected content and non-protected content, and generating the plurality of synthetic audio composites includes:

(A) obtaining a corpus of protected audio content from a protected-content repository and a corpus of event noises from an event sound repository, (B) randomly sampling one or more protected audio segments from the corpus of protected audio content and one or more event noise segments from the corpus of event noises, (C) executing one or more audio augmentation operations on the one or more protected audio segments and the one or more event noise segments to generate one or more augmented protected audio segments and one or more augmented event noise segments, (D) randomly sampling an impulse-response environment file from an impulse-response environment library comprising a plurality of impulse-response files that each represent acoustic characteristics of a distinct physical environment, (E) convolving the one or more protected audio segments and the one or more augmented event noise segments with the impulse-response file to generate one or more convolved protected audio segments and one or more convolved event noise segments;

(F) generating a respective synthetic audio composite that includes:

the one or more convolved protected audio segments at one or more first locations in the respective synthetic audio composite and the one or more convolved event noise segments at one or more second locations in the respective synthetic audio composite, and wherein protected-content classification metadata is stored in association with the respective synthetic audio composite and indicates that the respective synthetic audio composite includes the one or more convolved protected audio segments at the one or more first locations and the one or more convolved event noise segments at the one or more second locations; and (G) automatically repeating (B)-(F) until the plurality of synthetic audio composites satisfies a training sample diversity threshold.

3. The computer-implemented method according to claim 2, wherein using the plurality of synthetic audio composites to train an audio origination machine learning model of the one or more trained protected content recognition models includes:

creating a plurality of audio origination data training samples from the plurality of synthetic audio composites, wherein each of the plurality of audio origination data training samples:

corresponds to a respective synthetic audio composite of the plurality of synthetic audio composites, includes an input feature comprising the respective synthetic audio composite, includes a first audio origination source label when the respective synthetic audio composite is simulating a production-source environment, and includes a second, different from the first, audio origination source label when the respective synthetic audio composite is simulating a live-source environment;

inputting the plurality of audio origination data training samples to the audio origination machine learning model; and training the audio origination machine learning model to classify the input feature in each of the plurality of audio origination data training samples to one of: the first audio origination source label, and the second audio origination source label.

4. The computer-implemented method according to claim 2, wherein using the plurality of synthetic audio composites to train the plurality of trained audio separation machine learning models includes:

creating a plurality of audio separation training data samples from the plurality of synthetic audio composites, wherein each of the plurality of audio separation training data samples:

corresponds to a respective synthetic audio composite of the plurality of synthetic audio composites, includes an input feature comprising the respective synthetic audio composite, the respective synthetic audio composite including the one or more convolved protected audio segments and the one or more convolved event noise segments, and includes a target output feature comprising a first separated waveform comprising the one or more convolved protected audio segments and a second separated waveform comprising the one or more convolved event noise segments;

inputting the plurality of audio separation training data samples to the plurality of trained audio separation machine learning models, and training the plurality of trained audio separation machine learning models to separate the input feature in each of the plurality of audio separation training data samples into the first separated waveform and the second separated waveform.

5. The computer-implemented method according to claim 1, wherein:

the raw media item corresponds an audio-video recording comprising synchronized audio data and video data, the audio data in the audio-video recording includes:

non-protected audio data at least comprising the non-protected portions, including speech audio, crowd noise, and sports-related sounds, and protected audio data comprising the protected content, wherein the protected content correspond to one or more unlicensed songs.

6. The computer-implemented method according to claim 5, wherein generating the plurality of sanitized instances of the raw media item that separate the protected content from the non-protected portions of the raw media item includes:

inputting the raw media item to at least a first trained audio separation machine learning model and a second trained audio separation machine learning model of the plurality of trained audio separation machine learning models, wherein each of the plurality of trained audio separation machine learnings comprise a distinct set of separation and reconstruction weight and bias parameters;

generating, via the distinct set of separation and reconstruction weight and bias parameters associated with the first trained audio separation machine learning model, a first reconstructed audio track of the audio data that reconstructs the non-protected audio data while suppressing spectral components corresponding to the protected audio data;

generating, via the distinct set of separation and reconstruction weight and bias parameters associated with the second trained audio separation machine learning model, a second reconstructed audio track of the audio data that reconstructs the non-protected audio data while suppressing the spectral components corresponding to the protected audio data;

merging the first reconstructed audio track with the video data of the raw media item to generate a first sanitized instance of the plurality of sanitized instances of the raw media item; and merging the second reconstructed audio track with the video data of the raw media item to generate a second sanitized instance of the plurality of sanitized instances of the raw media item.

7. The computer-implemented method according to claim 1, wherein a respective trained protected-content recognition model of the one or more trained protected content recognition models detects the presence of the one or more protected media assets within the raw media item by:

generating, via the respective trained protected-content recognition model, a fingerprint vector of the raw media item that numerically encodes spectral and temporal characteristics of audio data in the raw media item;

constructing, via the respective trained protected-content recognition model, a protected-content search query that includes the fingerprint vector of the raw media item as a search parameter;

executing, via the respective trained protected-content recognition model, the protected-content search query against a protected-content fingerprint repository comprising a plurality of protected-content fingerprint vectors of a corpus of protected-content; and detecting, via the protected-content recognition model, the one or more temporal segments of the raw media item that include the one or more protected media assets based on executing the protected-content search query.

8. The computer-implemented method according to claim 1, wherein:

a protected-content recognition model of the one or more trained protected content recognition models detects that the one or more protected media assets occur across one or more time intervals of the raw media item, a protected-content localization machine learning model of the one or more trained protected content recognition models detects one or more time-indexed segments of the raw media item indicating where the one or more protected media assets temporally occur within the raw media item, the one or more temporal segments of the raw media item are detected by an audio origination machine learning model of the one or more trained protected content recognition models and correspond to one or more second time-indexed segments, wherein the one or more second time-indexed segments is a superset of the one or more time-indexed segments, and assigning the gradient intensity value to each gradient-encoded segment of the plurality of gradient-encoded segments at least includes:

detecting one or more remaining time intervals in the raw media item that do not overlap with the one or more time intervals detected by the protected-content recognition model, the one or more time-indexed segments detected by the protected-content localization machine learning model, and the one or more second time-indexed segments detected by the audio origination machine learning model, and assigning a pre-defined low gradient intensity value to a subset of the plurality of gradient-encoded segments that correspond to the one or more remaining time intervals.

9. The computer-implemented method according to claim 8, wherein assigning the gradient intensity value to each gradient-encoded segment of the plurality of gradient-encoded segments includes:

detecting that the one or more second time-indexed segments comprise a subset of time-indexed segments that are not included in the one or more time-indexed segments detected by the protected-content localization machine learning model, assigning a pre-defined intermediate gradient intensity value to a subset of the plurality of gradient-encoded segments that correspond to the subset of time-indexed segments, detecting a common set of time-indexed segments across the one or more time-indexed segments detected by the protected-content localization machine learning model and the one or more second time-indexed segments detected by the audio origination machine learning model, and assigning a pre-defined high gradient intensity value to a subset of the plurality of gradient-encoded segments that correspond to the common set of time-indexed segments across the one or more time-indexed segments and the one or more second time-indexed segments.

10. The computer-implemented method according to claim 1, wherein:

detecting the presence of the one or more protected media assets within the raw media item at least includes detecting that a first protected media asset begins at a first time within the raw media item and that a second protected media asset begins at a second time within the raw media item, and generating the protected-content segmentation map includes:

detecting that the first time within the raw media item corresponds to a first gradient-encoded segment of the plurality of gradient-encoded segments and that the second time within the raw media item corresponds to a second gradient-encoded segment of the plurality of gradient-encoded segments, and superimposing a first protected-content marker on the first gradient-encoded segment and a second protected-content marker on the second gradient-encoded segment.

11. The computer-implemented method according to claim 10, further comprising:

receiving, via the graphical user interface, a first input selecting the first-protected content marker and a second input selecting the second protected-content marker;

in response to receiving the first input selecting the first-protected content marker, displaying a first protected-content tooltip in association with the first-protected content marker, wherein the first protected-content tooltip includes text indicating a name associated with the first protected media asset and that the first protected media asset begins at the first time within the raw media item; and in response to receiving the second input selecting the second-protected content marker, displaying a second protected-content tooltip in association with the second-protected content marker, wherein the second-protected content marker includes text indicating a name associated with the second protected media asset and that the second protected media asset begins at the second time within the raw media item.

12. The computer-implemented method according to claim 1, wherein the graphical user interface displays the protected-content segmentation map in association with a media playback element and a play-pause control element, separate from native playback controls associated with the media playback element, the computer-implemented method further comprising:

receiving, via the graphical user interface, an input selecting a respective gradient-encoded segment of the plurality of gradient-encoded segments;

in response to receiving the input:

changing a playback position of the media playback element to correspond to the distinct time associated with the respective gradient-encoded segment;

automatically playing, by the media playback element, the raw media item from the playback position; and while the media playback element is playing the raw media item, continuously updating a playback progress indicator of the protected-content segmentation map in real time to indicate a current playback position of the raw media item relative to the plurality of gradient-encoded segments;

after receiving the input selecting the respective gradient-encoded segment, receiving a second input selecting the play-pause control element while the media playback element is playing the raw media item; and pausing the raw media item in the media playback element in response to receiving the second input selecting the play-pause control while the media playback element is playing the raw media item.

13. The computer-implemented method according to claim 12, wherein updating the playback progress indicator in real time as the media playback element is playing the raw media item includes:

moving the playback progress indicator along the protected-content segmentation map in synchronization with the current playback position of the raw media item in the media playback element, and as the playback progress indicator of the protected-content segmentation map is moving in synchronization with the current playback position of the raw media item in the media playback element, dynamically changing an opacity of one or more gradient-encoded segments of the plurality of gradient-encoded segments to visually indicate that the current playback position of the raw media item has progressed beyond the distinct time associated with each of the one or more gradient-encoded segments.

14. The computer-implemented method according to claim 13, wherein the graphical user interface includes a first container comprising:

a content readiness indicator that instructs a subscriber to review the raw media item before publication when the presence of the one or more protected media assets is detected in the raw media item, the protected-content segmentation map, the play-pause control that, when selected, causes the media playback element to play the raw media item, and a protected-asset table that comprises one or more rows that each include metadata corresponding to a distinct one of the one or more protected media assets detected within the raw media item.

15. The computer-implemented method according to claim 14, wherein the graphical user interface includes:

a second container comprising the media playback element; and a third container comprising metadata associated with the raw media item, including at least:

a filename associated with the raw media item, an amount of time required to generate the plurality of sanitized instances of the raw media item, the subscriber that uploaded the raw media item to the remote media sanitization service, an upload date associated with the raw media item, and a duration of the raw media item.

16. The computer-implemented method according to claim 15, wherein the graphical user interface includes a fourth container comprising:

a download selectable object that, when selected, causes the plurality of sanitized instances of the raw media item to be downloaded to a target electronic device, and a plurality of sanitized-version cards that each:

correspond to a distinct sanitized instance of the plurality of sanitized instances of the raw media item, include a second play-pause control that, when selected, causes the distinct sanitized instance to play in the media playback element, a distinct download selectable object that, when selected, causes the distinct sanitized instance to be downloaded to the target electronic device, a copy link selectable object that, when selected, causes a shareable network link associated with the distinct sanitized instance to be copied to a clipboard of the target electronic device, and a publication readiness indicator that indicates that the distinct sanitized instance is ready to publish when the distinct sanitized instance does not include the one or more protected media assets.

17. A computer-implemented system comprising:

one or more processors;

a memory;

a computer-readable medium operably coupled to the one or more processors, the computer-readable medium having computer-readable instructions stored thereon that, when executed by the one or more processors, cause a computing device to perform operations comprising:

at a remote media sanitization service being implemented by a distributed network of computers:

receiving, via the distributed network of computers, a subscriber-initiated request to remove protected content from a raw media item;

in response to receiving the subscriber-initiated request:

automatically routing, by the distributed network of computers, the raw media item to an audio recognition service of the remote media sanitization service that comprises one or more trained protected content recognition models;

generating, by the audio recognition service executing the one or more trained protected content recognition models, one or more audio origination labels that indicate an origination source for the protected content associated with one or more temporal segments of the raw media item;

automatically routing, by the distributed network of computers, the raw media item to an audio sanitization service of the remote media sanitization service that comprises a plurality of trained audio separation machine learning models;

55 generating, by the audio sanitization service executing the plurality of audio separation machine learning models, a plurality of sanitized instances of the raw media item that separate the protected content from non-protected portions of the raw media item; and returning a response to the subscriber-initiated request that uses the one or more audio origination labels and the plurality of sanitized instances of the raw media item to prevent unauthorized electronic distribution of the protected content, wherein returning the response to the subscriber-initiated request includes:

generating, based on executing the one or more trained protected content recognition models, a protected-content segmentation map comprising a plurality of gradient-encoded segments extending from a start to an end of the raw media item, wherein each gradient-encoded segment of the plurality of gradient-encoded segments:

corresponds to a distinct time between the start and the end of the raw media item, and is assigned a gradient intensity value based on a likelihood that the distinct time within the raw media item includes a presence of one or more protected media assets; and displaying a graphical user interface that includes the plurality of sanitized instances of the raw media item and the protected-content segmentation map of the raw media item.

18. A computer-implemented method for automatically removing protected content from a raw media item, the computer-implemented method comprising:

at a remote media sanitization service being implemented by a distributed network of computers:

receiving, via the distributed network of computers, a subscriber-initiated request to remove protected content from a raw media item;

in response to receiving the subscriber-initiated request:

automatically routing, by the distributed network of computers, the raw media item to an audio recognition service of the remote media sanitization service that comprises one or more trained protected content recognition models;

generating, by the audio recognition service executing the one or more trained protected content recognition models, one or more audio origination labels that indicate an origination source for the protected content associated with one or more temporal segments of the raw media item;

automatically routing, by the distributed network of computers, the raw media item to an audio sanitization service of the remote media sanitization service that comprises a plurality of trained audio separation machine learning models;

generating, by the audio sanitization service executing the plurality of trained audio separation machine learning models, a plurality of sanitized instances of the raw media item that separate the protected content from non-protected portions of the raw media item; and returning a response to the subscriber-initiated request that uses the one or more audio origination labels and the plurality of sanitized instances of the raw media item to prevent unauthorized electronic distribution of the protected content, wherein:

the one or more trained protected content recognition models and the plurality of trained audio separation machine learning models are trained using a plurality of synthetic audio composites that simulate real-world combinations of the protected content and non-protected content, and generating the plurality of synthetic audio composites includes:

(A) obtaining a corpus of protected audio content from a protected-content repository and a corpus of event noises from an event sound repository, (B) randomly sampling one or more protected audio segments from the corpus of protected audio content and one or more event noise segments from the corpus of event noises, (C) executing one or more audio augmentation operations on the one or more protected audio segments and the one or more event noise segments to generate one or more augmented protected audio segments and one or more augmented event noise segments, (D) randomly sampling an impulse-response environment file from an impulse-response environment library comprising a plurality of impulse-response files that each represent acoustic characteristics of a distinct physical environment, (E) convolving the one or more augmented protected audio segments and the one or more augmented event noise segments with the impulse-response environment file to generate one or more convolved protected audio segments and one or more convolved event noise segments;

(F) generating a respective synthetic audio composite that includes:

the one or more convolved protected audio segments at one or more first locations in the respective synthetic audio composite and the one or more convolved event noise segments at one or more second locations in the respective synthetic audio composite, and wherein protected-content classification metadata is stored in association with the respective synthetic audio composite and indicates that the respective synthetic audio composite includes the one or more convolved protected audio segments at the one or more first locations and the one or more convolved event noise segments at the one or more second locations; and (G) automatically repeating (B)-(F) until the plurality of synthetic audio composites satisfies a training sample diversity threshold.

* * * * *